(12) United States Patent
Gronholm et al.

(10) Patent No.: US 11,575,876 B2
(45) Date of Patent: Feb. 7, 2023

(54) STEREO VIEWING

(71) Applicant: Nokia Technologies Oy, Espoo (FI)

(72) Inventors: Kim Gronholm, Helsinki (FI); Andrew Robert Baldwin, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 15/431,279

(22) Filed: Feb. 13, 2017

(65) Prior Publication Data

US 2017/0163970 A1    Jun. 8, 2017

Related U.S. Application Data

(63) Continuation of application No. 15/302,123, filed as application No. PCT/FI2015/050184 on Mar. 19, 2015.

(30) Foreign Application Priority Data

Apr. 7, 2014    (GB) ..................................... 1406201

(51) Int. Cl.
*H04N 13/279*    (2018.01)
*G03B 37/04*    (2021.01)
(Continued)

(52) U.S. Cl.
CPC ....... *H04N 13/279* (2018.05); *G02B 27/0093* (2013.01); *G02B 30/34* (2020.01);
(Continued)

(58) Field of Classification Search
CPC .. H04N 13/279; H04N 19/124; H04N 19/162; H04N 19/167; H04N 19/17;
(Continued)

(56) References Cited

U.S. PATENT DOCUMENTS 3,225,651 A    12/1965 Clay
5,657,073 A    8/1997 Henley
(Continued)

FOREIGN PATENT DOCUMENTS

AU    2015 245446 A1    9/2016
CN    101414054 A    4/2009
(Continued)

OTHER PUBLICATIONS

Non-Final Office action received for corresponding U.S. Appl. No. 15/302,123, dated Feb. 5, 2018, 14 pages.
(Continued)

*Primary Examiner* — James T Boylan
(74) *Attorney, Agent, or Firm* — Alston & Bird LLP

(57) ABSTRACT

The invention relates to creating and viewing stereo images, for example stereo video images, also called 3D video. At least three camera sources with overlapping fields of view are used to capture a scene so that an area of the scene is covered by at least three cameras. At the viewer, a camera pair is chosen from the multiple cameras to create a stereo camera pair that best matches the location of the eyes of the user if they were located at the place of the camera sources. That is, a camera pair is chosen so that the disparity created by the camera sources resembles the disparity that the user's eyes would have at that location. If the user tilts his head, or the view orientation is otherwise altered, a new pair can be formed, for example by switching the other camera. The viewer device then forms the images of the video frames for the left and right eyes by picking the best sources for each area of each image for realistic stereo disparity.

23 Claims, 16 Drawing Sheets

(51) Int. Cl.
| | |
|---|---|
| *H04N 19/597* | (2014.01) |
| *H04N 19/17* | (2014.01) |
| *H04N 19/167* | (2014.01) |
| *G03B 35/08* | (2021.01) |
| *H04N 19/162* | (2014.01) |
| *H04N 19/124* | (2014.01) |
| *H04N 13/383* | (2018.01) |
| *G06F 3/04815* | (2022.01) |
| *G06F 3/01* | (2006.01) |
| *G02B 30/34* | (2020.01) |
| *H04N 13/257* | (2018.01) |
| *H04N 13/156* | (2018.01) |
| *H04N 13/324* | (2018.01) |
| *H04N 13/344* | (2018.01) |
| *H04N 13/296* | (2018.01) |
| *H04N 13/243* | (2018.01) |
| *H04N 13/366* | (2018.01) |
| *G02B 27/00* | (2006.01) |
| *G06F 3/16* | (2006.01) |
| *H04N 13/378* | (2018.01) |
| *H04N 13/161* | (2018.01) |
| *H04N 13/189* | (2018.01) |
| *H04N 13/282* | (2018.01) |
| *G03B 35/18* | (2021.01) |
| *G02B 27/01* | (2006.01) |

(52) U.S. Cl.
CPC ............ *G03B 35/08* (2013.01); *G03B 37/04* (2013.01); *G06F 3/011* (2013.01); *G06F 3/012* (2013.01); *G06F 3/04815* (2013.01); *G06F 3/16* (2013.01); *H04N 13/156* (2018.05); *H04N 13/161* (2018.05); *H04N 13/189* (2018.05); *H04N 13/243* (2018.05); *H04N 13/257* (2018.05); *H04N 13/282* (2018.05); *H04N 13/296* (2018.05); *H04N 13/324* (2018.05); *H04N 13/344* (2018.05); *H04N 13/366* (2018.05); *H04N 13/378* (2018.05); *H04N 13/383* (2018.05); *H04N 19/124* (2014.11); *H04N 19/162* (2014.11); *H04N 19/167* (2014.11); *H04N 19/17* (2014.11); *H04N 19/597* (2014.11); *G02B 2027/0134* (2013.01); *G02B 2027/0187* (2013.01); *G03B 35/18* (2013.01); *H04N 2213/008* (2013.01)

(58) Field of Classification Search
CPC .. H04N 19/597; H04N 13/189; H04N 13/257; H04N 13/383; H04N 13/156; H04N 13/324; H04N 13/344; H04N 13/296; H04N 13/378; H04N 13/161; H04N 13/243; H04N 13/282; H04N 13/366; H04N 2213/008; G02B 30/34; G02B 27/0093; G02B 2027/0134; G02B 2027/0187; G03B 35/08; G03B 37/04; G03B 35/18; G06F 3/011; G06F 3/012; G06F 3/04815; G06F 3/16
See application file for complete search history.

(56) References Cited

U.S. PATENT DOCUMENTS

| | | | |
|---|---|---|---|
| 5,684,531 A | | 11/1997 | Li et al. |
| 5,703,604 A | | 12/1997 | McCutchen |
| 6,055,012 A | | 4/2000 | Haskell et al. |
| 6,141,034 A | | 10/2000 | McCutchen |
| 6,434,265 B1 | * | 8/2002 | Xiong ............... G06K 9/32 |
| | | | 382/154 |
| 6,529,631 B1 | | 3/2003 | Peterson et al. |
| 7,075,553 B2 | | 7/2006 | Miller et al. |
| 7,850,306 B2 | | 12/2010 | Uusitalo et al. |
| 8,493,390 B2 | | 7/2013 | Kalinli |
| 8,502,860 B2 | | 8/2013 | Demirdjian |
| 2002/0015522 A1 | | 2/2002 | Rogina et al. |
| 2002/0046218 A1 | | 4/2002 | Gilbert et al. |
| 2002/0110275 A1 | | 8/2002 | Rogina et al. |
| 2002/0118890 A1 | * | 8/2002 | Rondinelli ............ G06T 3/0062 |
| | | | 382/276 |
| 2003/0067536 A1 | * | 4/2003 | Boulanger ........... H04N 13/376 |
| | | | 348/14.08 |
| 2003/0117488 A1 | | 6/2003 | Pierce et al. |
| 2004/0125222 A1 | | 7/2004 | Bradski et al. |
| 2004/0227693 A1 | * | 11/2004 | Rambo ................. H04N 7/144 |
| | | | 345/6 |
| 2004/0246333 A1 | * | 12/2004 | Steuart, III ............ G03B 35/08 |
| | | | 348/36 |
| 2005/0018911 A1 | * | 1/2005 | Deever .................. H04N 19/17 |
| | | | 382/232 |
| 2005/0138569 A1 | | 6/2005 | Baxter et al. |
| 2007/0103558 A1 | | 5/2007 | Cai et al. |
| 2008/0002262 A1 | * | 1/2008 | Chirieleison ...... G02B 27/0093 |
| | | | 359/630 |
| 2008/0298674 A1 | | 12/2008 | Baker et al. |
| 2009/0096927 A1 | * | 4/2009 | Camp, Jr ............. G06K 9/3241 |
| | | | 348/613 |
| 2010/0080291 A1 | | 4/2010 | Yamatoto et al. |
| 2010/0220215 A1 | | 9/2010 | Rubinstein et al. |
| 2010/0238262 A1 | | 9/2010 | Kurtz et al. |
| 2011/0187706 A1 | | 8/2011 | Vesely et al. |
| 2011/0229012 A1 | * | 9/2011 | Singhal ............. G06K 9/00201 |
| | | | 382/154 |
| 2012/0147139 A1 | | 6/2012 | Li et al. |
| 2012/0224642 A1 | | 9/2012 | Sines et al. |
| 2012/0320979 A1 | | 12/2012 | Lundberg |
| 2013/0050412 A1 | * | 2/2013 | Shinohara ........... H04N 13/279 |
| | | | 348/42 |
| 2013/0125155 A1 | | 5/2013 | Bhagavathy et al. |
| 2013/0135446 A1 | | 5/2013 | Lee et al. |
| 2013/0176403 A1 | | 7/2013 | Varga |
| 2013/0185353 A1 | | 7/2013 | Rondao Alface et al. |
| 2013/0201296 A1 | | 8/2013 | Weiss et al. |
| 2013/0222590 A1 | * | 8/2013 | O'Brien ................. H04N 7/185 |
| | | | 348/148 |
| 2013/0258044 A1 | | 10/2013 | Betts-Lacroix |
| 2014/0104378 A1 | | 4/2014 | Kauff et al. |
| 2014/0104424 A1 | | 4/2014 | Zhang et al. |
| 2014/0118562 A1 | | 5/2014 | Bivoiarsky |
| 2014/0168478 A1 | | 6/2014 | Baheti et al. |
| 2014/0192155 A1 | | 7/2014 | Choi et al. |
| 2014/0267596 A1 | * | 9/2014 | Geerds ................. H04N 5/2252 |
| | | | 348/38 |
| 2016/0205341 A1 | | 7/2016 | Hollander et al. |
| 2017/0118458 A1 | | 4/2017 | Gronholm et al. |
| 2017/0155884 A1 | | 6/2017 | Gronholm et al. |

FOREIGN PATENT DOCUMENTS

| | | | |
|---|---|---|---|
| CN | 102318374 A | | 1/2012 |
| CN | 102819179 A | | 12/2012 |
| CN | 103323948 A | | 9/2013 |
| CN | 103380625 A | | 10/2013 |
| EP | 2685707 A1 | | 1/2014 |
| GB | 2494940 | * | 9/2011 |
| JP | H06-046313 A | | 2/1994 |
| JP | H11164326 A | | 6/1999 |
| JP | 2001-351126 A | | 12/2001 |
| JP | 2002-171460 A | | 6/2002 |
| JP | 2002-258423 A | | 9/2002 |
| JP | 2002-354505 A | | 12/2002 |
| JP | 2004-072694 A | | 3/2004 |
| JP | 2004-514951 A | | 5/2004 |
| JP | 2013-183209 A | | 9/2013 |
| RU | 2375840 C2 | | 12/2009 |
| WO | 2001/079908 A1 | | 10/2001 |
| WO | 2002/044808 A2 | | 6/2002 |
| WO | 2003/030535 A1 | | 4/2003 |
| WO | 2004/068865 A1 | | 8/2004 |

(56) References Cited

FOREIGN PATENT DOCUMENTS

| WO | 2004/109385 A2 | 12/2004 |
|---|---|---|
| WO | 2009/151953 A2 | 12/2009 |
| WO | 2012/021129 A1 | 2/2012 |
| WO | WO 2012 136388 A1 | 10/2012 |
| WO | 2012/177378 A2 | 12/2012 |
| WO | 2013/015148 A1 | 1/2013 |
| WO | 2013/022296 A2 | 2/2013 |
| WO | 2015/155406 A1 | 10/2015 |

OTHER PUBLICATIONS

Office action received for corresponding Japanese Patent Application No. 2016-561358, dated Feb. 6, 2018, 4 pages of office action and 9 pages of translation available.
Office action received for corresponding Chinese Patent Application No. 201580018687.4, dated Jul. 7, 2017, 5 pages of office action and 3 pages of translation available.
Office action received for corresponding Canadian Patent Application No. 2943856, dated May 25, 2018, 5 pages.
Final Office action received for corresponding Russian Patent Application No. 2016141397, dated Nov. 28, 2017, 18 pages of office action and 11 pages of translation available.
Office action received for corresponding Chinese Patent Application No. 201580018687.4, dated Mar. 8, 2018, 7 pages of office action and 3 pages of translation available.
Couture et al., "Panoramic Stereo Video Textures", IEEE International Conference on Computer Vision, Nov. 5-13, 2011, 8 pages.
Vivet et al., "Real-Time Stereo Mosaicing Using Feature Tracking", IEEE International Symposium on Multimedia, Dec. 5-7, 2011, pp. 577-582.
Richardt et al., "Megastereo: Constructing High-Resolution Stereo Panoramas", IEEE Conference on Computer Vision and Pattern Recognition, Jun. 23-28, 2013, pp. 1-8.
Couture et al., "Perception of Blending in Stereo Motion Panoramas", ACM Transactions on Applied Perception, vol. 2, No. 3, May 2010, 10 pages.
"Wide-Angle Stereo Photography", Accessorizing Your Stereo Camera, Retrieved on Mar. 6, Webpage available at : http://www.lhup.edu/~dsimanek/3d/stereo/3dgallery19.htm.
Ekmekcioglu et al., "Content Aware delivery of Visual Attention Based Scalable Multi-View Video Over P2P", 19th International Packet Video Workshop, May 10-11, 2012, pp. 71-76.
Search Report received for corresponding United Kingdom Patent Application No. 1406201.2, dated Oct. 15, 2014, 3 pages.
Search Report received for corresponding United Kingdom Patent Application No. 1406201.2, dated Mar. 3, 2015, 2 pages.
International Search Report and Written Opinion received for corresponding Patent Cooperation Treaty Application No. PCT/FI2015/050184, dated Jul. 9, 2015, 21 pages.
"Meet The Crazy Camera That Can Make Movies for the Oculus Rift", Gizmodo, Retrieved on Mar. 6, Webpage available at : http://gizmodo.com/meet-the-crazy-camera-that-could-make-movies-for-the-oc-1557318674.
"Panocam 3d : Panoramic 3d Camera", Oculus VR Forums, Retrieved on Mar. 6, Webpage available at : https://forums.oculus.com/vip/discussion/4984/panocam-3d-panoramic-3d-camera.
Mavlankar et al., "Video Streaming With Interactive Pan/Tilt/Zoom", High-Quality Visual Experience Signals and Communication Technology, 2010, pp. 1-26.
Office action received for corresponding Vietnam Patent Application No. 1-2016-03961, dated Dec. 13, 2016, 1 pages of office action and 1 pages of office action translation available.
Extended European Search Report received for corresponding European Patent Application No. 17164124.4, dated Jun. 2, 2017, 7 pages.
Extended European Search Report received for corresponding European Patent Application No. 17164118.6, dated Jun. 8, 2017, 7 pages.

Office action received for corresponding Canadian Patent Application No. 2943856, dated Jul. 11, 2017, 3 pages.
Extended European Search Report received for corresponding European Patent Application No. 15777524.8, dated Nov. 24, 2017, 10 pages.
Office action received for corresponding Korean Patent Application No. 2016-7030907, dated Dec. 5, 2017, 4 pages of office action and no page of translation available.
Office action received for corresponding Australian Patent Application No. 2015245446, dated Jul. 6, 2018, 4 pages.
Final Office action received for corresponding U.S. Appl. No. 15/302,123, dated Jul. 17, 2018, 15 pages.
Non-Final Office action received for corresponding U.S. Appl. No. 15/430,779, dated Jul. 31, 2018, 9 pages.
Office Action for Japanese Application No. 2016-561358 dated Oct. 16, 2018, 5 pages.
Advisory Action for U.S. Appl. No. 15/302,123 dated Oct. 30, 2018.
Office Action for Chinese Application No. 2015800186874 dated Nov. 28, 2018, 6 pages.
Office Action for European Application No. 17 164 118.6 dated Sep. 25, 2018, 4 pages.
Office Action for European Application No. 17 164 124.4 dated Sep. 25, 2018, 4 pages.
Office Action for Canadian Application No. 2,943,856 dated Feb. 7, 2019, 5 pages.
Office Action for European Application No. 17 164 118.6 dated Feb. 11, 2019, 4 pages.
Office Action for U.S. Appl. No. 15/302,123 dated Jan. 9, 2019.
Office Action for U.S. Appl. No. 15/430,779 dated Jan. 28, 2019, 12 pages.
Office Action for Mexican Application No. MX/a/2016/012988 dated May 22, 2019, 6 pages.
Office Action for Chinese Application No. 2015800186874 dated Jun. 13, 2019, 17 pages.
Decision to Grant for European Application No. 17164124.4 dated Jun. 27, 2019, 2 pages.
Notice of Allowance for U.S. Appl. No. 15/302,123 dated Jun. 11, 2019.
Intention to Grant for European Application No. 17 164 124.4 dated Mar. 25, 2019, 5 pages.
Intention to Grant for European Application No. 15 777 524.8 dated Feb. 2, 2019, 5 pages.
Office Action for U.S. Appl. No. 15/430,779 dated Aug. 27, 2019.
Summons to Attend Oral proceedings for European Application No. 15777524.8 dated Jul. 25, 2019, 4 pages.
Intention to Grant for European Application No. 17 164 118.6 dated Aug. 5, 2019, 6 pages.
Notice of Allowance for U.S. Appl. No. 15/430,779 dated Dec. 30, 2019.
Decision to Grant European Application No. 17164118.6 dated Dec. 12, 2019, 2 pages.
Office Action for Japanese Application No. 2016-561358 dated Feb. 4, 2020, 17 pages.
Office Action for Chinese Application No. 201580018687 dated Mar. 17, 2020, 19 pages.
Office Action for India Application No. 201647037329 dated Mar. 16, 2020, 7 pages.
Notice of the Result of Substantive Examination for Indonesian Application No. P00201607272 dated Feb. 26, 2020, 4 pages.
Office Action for Indonesia Application No. P00201607272 dated Aug. 26, 2020, 5 pages.
Office Action for Philippine Application No. 1/2016/501960 dated Sep. 10, 2020, 3 pages.
Office Action for Vietnam Application No. 1-2016-03961 dated Aug. 14, 2020, 4 pages.
Office Action for Philippine Application No. 1/2016/501960 dated May 17, 2021, 7 pages.
Office Action for Philippine Application No. 1/2016/501960 dated Nov. 22, 2021, 3 pages.

* cited by examiner

Fig. 6a
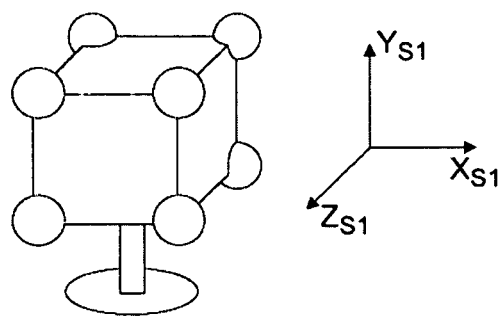
Fig. 6b
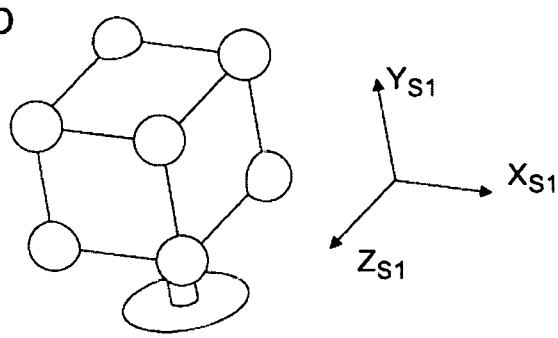
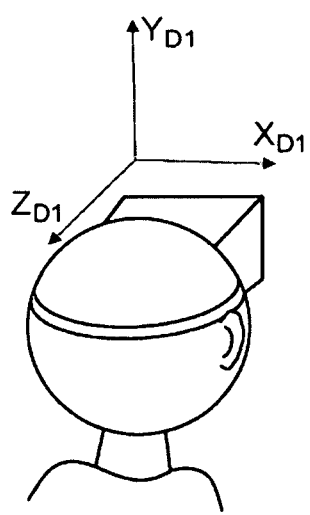
Fig. 6c
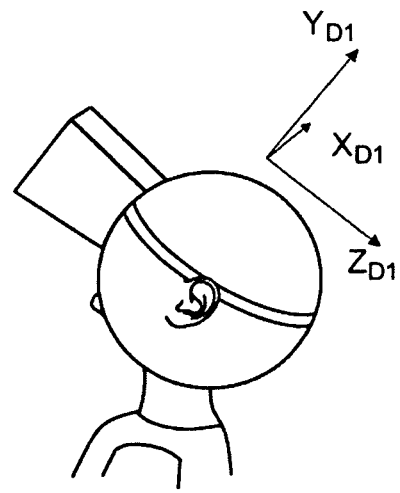
Fig. 6d

STEREO VIEWING

BACKGROUND

Digital stereo viewing of still and moving images has become commonplace, and equipment for viewing 3D (three-dimensional) movies is more widely available. Theatres are offering 3D movies based on viewing the movie with special glasses that ensure the viewing of different images for the left and right eye for each frame of the movie. The same approach has been brought to home use with 3D-capable players and television sets. In practice, the movie consists of two views to the same scene, one for the left eye and one for the right eye. These views have been created by capturing the movie with a special stereo camera that directly creates this content suitable for stereo viewing. When the views are presented to the two eyes, the human visual system creates a 3D view of the scene. This technology has the drawback that the viewing area (movie screen or television) only occupies part of the field of vision, and thus the experience of 3D view is limited.

For a more realistic experience, devices occupying a larger area of the total field of view have been created. There are available special stereo viewing goggles that are meant to be worn on the head so that they cover the eyes and display pictures for the left and right eye with a small screen and lens arrangement. Such technology has also the advantage that it can be used in a small space, and even while on the move, compared to fairly large TV sets commonly used for 3D viewing. For gaming purposes, there are games that are compatible with such stereo glasses, and are able to create the two images required for stereo viewing of the artificial game world, thus creating a 3D view of the internal model of the game scene. The different pictures are rendered in real time from the model, and therefore this approach requires computing power especially if the game's scene model is complex and very detailed and contains a lot of objects.

There is, therefore, a need for solutions that enable stereo viewing, that is, viewing of a 3D image.

SUMMARY

Now there has been invented an improved method and technical equipment implementing the method, by which the above problems are alleviated. Various aspects of the invention include a method, a camera apparatus, a server, a client renderer and a computer readable medium comprising a computer program stored therein, which are characterized by what is stated in the independent claims. Various embodiments of the invention are disclosed in the dependent claims.

The invention relates to creating and viewing stereo images, for example stereo video images, also called 3D video. At least three camera sources with overlapping fields of view are used to capture a scene so that an area of the scene is covered by at least three cameras. At the viewer, a camera pair is chosen from the multiple cameras to create a stereo camera pair that best matches the location of the eyes of the user if they were located at the place of the camera sources. That is, a camera pair is chosen so that the disparity created by the camera sources resembles the disparity that the user's eyes would have at that location. If the user tilts his head, or the view orientation is otherwise altered, a new pair can be formed, for example by switching the other camera. The viewer device then forms the images of the video frames for the left and right eyes by picking the best sources for each area of each image for realistic stereo disparity.

There is provided a method, comprising determining head orientation of a user to obtain a first head orientation, selecting a first image source and a second image source based on said first head orientation, said first and second image source forming a stereo image source, rendering a first stereo image by rendering a first target image for one eye of the user using said first image source and a second target image for another eye of the user using said second image source, determining head orientation of said user to obtain a second head orientation, selecting said second image source and a third image source based on said second head orientation, said second and third image source forming a stereo image source, and rendering a second stereo image by rendering a third target image for one eye of the user using said second image source and a fourth target image for another eye of the user using said third image source.

There is provided a method, comprising determining head orientations of a user for forming a stereo video sequence of a scene, selecting a first image source, a second image source and a third image source based on said head orientations, and rendering said stereo video sequence by rendering an image sequence for the left eye of the user using said first image source and said second image source and an image sequence for the right eye of the user using said first image source and said third image source, wherein said first image source is used to render different areas of said scene for the left and right eyes of the user in each stereo frame of said video sequence.

There is provided a method, comprising encoding a plurality of source video signals for stereo viewing, said source video signals comprising video data from a plurality of camera sources, said source video signals comprising active scene area signals and passive scene area signals, transmitting said plurality of source video signals to a stereo viewing device for viewing, carrying out at least one of said encoding and transmitting so that in the transmitted source video signals said active scene area signals have been encoded with higher fidelity than said passive scene area signals; said active and passive scene area signals corresponding to a head orientation of a user so that said active scene area signals correspond to the scene areas the user is viewing and sad passive scene area signals correspond to other scene areas.

There is provided a camera device for creating stereo viewing image data, comprising at least three cameras in a regular or irregular setting located in such a manner with respect to each other that any pair of cameras of said at least three cameras has a disparity for creating a stereo image having a disparity, said at least three cameras having overlapping fields of view such that an overlap region for which every part is captured by said at least three cameras is defined. The camera device may be such that said any pair of cameras of said at least three cameras has a parallax corresponding to parallax of human eyes for creating a stereo image. The camera device may be such that the at least three cameras comprise eight wide-field cameras positioned essentially at the corners of a virtual cube and each having a direction of optical axis essentially from the center point of the virtual cube to the corner in a regular manner, wherein the field of view of each of said wide-field cameras is at least 180 degrees, so that each part of the whole sphere view is covered by at least four cameras.

There is provided an apparatus comprising at least one processor, memory including computer program code, the memory and the computer program code configured to, with the at least one processor, cause the apparatus to at least determine head orientation of a user to obtain a first head orientation, select a first image source and a second image source based on said first head orientation, said first and second image source forming a stereo image source, render a first stereo image by rendering a first target image for one eye of the user using said first image source and a second target image for another eye of the user using said second image source, determine head orientation of said user to obtain a second head orientation, select said second image source and a third image source based on said second head orientation, said second and third image source forming a stereo image source, render a second stereo image by rendering a third target image for one eye of the user using said second image source and a fourth target image for another eye of the user using said third image source.

There is provided an apparatus comprising at least one processor, memory including computer program code, the memory and the computer program code configured to, with the at least one processor, cause the apparatus to at least determine head orientations of a user for forming a stereo video sequence of a scene, select a first image source, a second image source and a third image source based on said head orientations, and render said stereo video sequence by rendering an image sequence for the left eye of the user using said first image source and said second image source and an image sequence for the right eye of the user using said first image source and said third image source, wherein said first image source is used to render different areas of said scene for the left and right eyes of the user in each stereo frame of said video sequence.

There is provided an apparatus comprising at least one processor, memory including computer program code, the memory and the computer program code configured to, with the at least one processor, cause the apparatus to at least encode a plurality of source video signals for stereo viewing, said source video signals comprising video data from a plurality of camera sources, said source video signals comprising active scene area signals and passive scene area signals transmit said plurality of source video signals to a stereo viewing device for viewing, carry out at least one of said encoding and transmitting so that in the transmitted source video signals said active scene area signals have been encoded with higher fidelity than said passive scene area signals; said active and passive scene area signals corresponding to a head orientation of a user so that said active scene area signals correspond to the scene areas the user is viewing and sad passive scene area signals correspond to other scene areas.

There is provided a system comprising at least one processor, memory including computer program code, the memory and the computer program code configured to, with the at least one processor, cause the system to at least determine head orientation of a user to obtain a first head orientation, select a first image source and a second image source based on said first head orientation, said first and second image source forming a stereo image source, render a first stereo image by rendering a first target image for one eye of the user using said first image source and a second target image for another eye of the user using said second image source, determine head orientation of said user to obtain a second head orientation, select said second image source and a third image source based on said second head orientation, said second and third image source forming a stereo image source, render a second stereo image by rendering a third target image for one eye of the user using said second image source and a fourth target image for another eye of the user using said third image source.

There is provided a computer program product embodied on a non-transitory computer readable medium, comprising computer program code configured to, when executed on at least one processor, cause an apparatus or a system to determine head orientation of a user to obtain a first head orientation, select a first image source and a second image source based on said first head orientation, said first and second image source forming a stereo image source, render a first stereo image by rendering a first target image for one eye of the user using said first image source and a second target image for another eye of the user using said second image source, determine head orientation of said user to obtain a second head orientation, select said second image source and a third image source based on said second head orientation, said second and third image source forming a stereo image source, and render a second stereo image by rendering a third target image for one eye of the user using said second image source and a fourth target image for another eye of the user using said third image source.

There is provided an apparatus, comprising means for determining head orientation of a user to obtain a first head orientation, means for selecting a first image source and a second image source based on said first head orientation, said first and second image source forming a stereo image source, means for rendering a first stereo image by rendering a first target image for one eye of the user using said first image source and a second target image for another eye of the user using said second image source, means for determining head orientation of said user to obtain a second head orientation, means for selecting said second image source and a third image source based on said second head orientation, said second and third image source forming a stereo image source, means for rendering a second stereo image by rendering a third target image for one eye of the user using said second image source and a fourth target image for another eye of the user using said third image source.

There is provided a method, comprising determining head orientation of a user to obtain a first head orientation, selecting a first image source and a second image source based on said first head orientation, said first and second image source forming a stereo image source, rendering a first stereo image by rendering a first target image for one eye of the user using said first image source and a second target image for another eye of the user using said second image source, determining head orientation of said user to obtain a second head orientation, selecting said second image source and a third image source based on said second head orientation, said second and third image source forming a stereo image source, rendering a second stereo image by rendering a third target image for one eye of the user using said second image source and a fourth target image for another eye of the user using said third image source, blending a temporal transition from said image formed using said first image source and said image using said third image source. The method may comprise adjusting the duration of the temporal transition blending by using information on head movement speed.

There is provided a method, comprising determining head orientation of a user to obtain a first head orientation, selecting a first image source and a second image source based on said first head orientation, said first and second image source forming a stereo image source, rendering a first stereo image by rendering a first target image for one eye of the user using said first image source and a second target image for another eye of the user using said second image source, determining head orientation of said user to obtain a second head orientation, selecting said second image source and a third image source based on said second head orientation, said second and third image source forming a stereo image source, rendering a second stereo image by rendering a third target image for one eye of the user using said second image source and a fourth target image for another eye of the user using said third image source, determining source orientation information for said image sources, and using said source orientation information together with said head orientation information for selecting said image sources.

There is provided a method, comprising determining head orientation of a user to obtain a first head orientation, selecting a first image source and a second image source based on said first head orientation, said first and second image source forming a stereo image source, rendering a first stereo image by rendering a first target image for one eye of the user using said first image source and a second target image for another eye of the user using said second image source, determining head orientation of said user to obtain a second head orientation, selecting said second image source and a third image source based on said second head orientation, said second and third image source forming a stereo image source, rendering a second stereo image by rendering a third target image for one eye of the user using said second image source and a fourth target image for another eye of the user using said third image source, wherein forming said first, second and third image sources as an output of a computer device using virtual cameras for producing rendered synthetic images for said first, second and third image sources.

DESCRIPTION OF THE DRAWINGS

In the following, various embodiments of the invention will be described in more detail with reference to the appended drawings, in which FIGS. 1a, 1b, 1c and 1d
i. show a setup for forming a stereo image to a user;
FIGS. 6a, 6b, 6c and 6d
i. show the use of source and destination coordinate systems for stereo viewing.

DESCRIPTION OF EXAMPLE EMBODIMENTS

In the following, several embodiments of the invention will be described in the context of stereo viewing with 3D glasses. It is to be noted, however, that the invention is not limited to any specific display technology. In fact, the different embodiments have applications in any environment where stereo viewing is required, for example movies and television. Additionally, while the description uses a certain camera setup as an example of an image source, different camera setups and image source arrangements can be used.

Figure 1A:
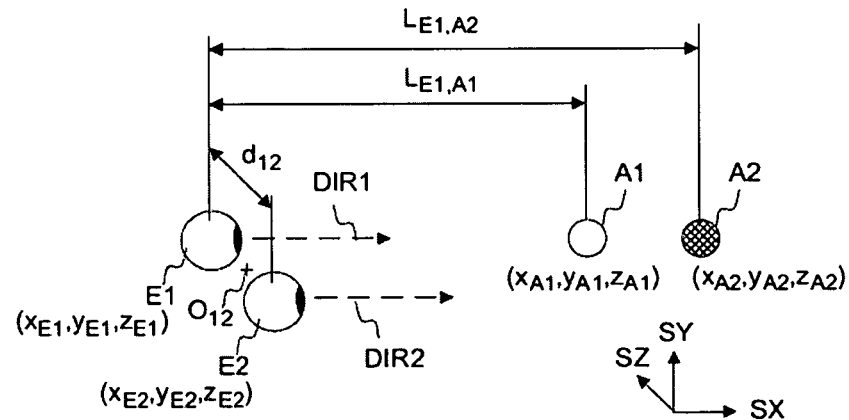

FIGS. 1a, 1b, 1c and 1d show a setup for forming a stereo image to a user. In FIG. 1a, a situation is shown where a human being is viewing two spheres A1 and A2 using both eyes E1 and E2. The sphere A1 is closer to the viewer than the sphere A2, the respective distances to the first eye E1 being $LE_{E1,A1}$ and $LE_{E1,A2}$. The different objects reside in space at their respective (x,y,z) coordinates, defined by the coordinate system SZ, SY and SZ. The distance $d_{12}$ between the eyes of a human being may be approximately 62-64 mm on average, and varying from person to person between 55 and 74 mm. This distance is referred to as the parallax, on which stereoscopic view of the human vision is based on. The viewing directions (optical axes) DIR1 and DIR2 are typically essentially parallel, possibly having a small deviation from being parallel, and define the field of view for the eyes. The head of the user has an orientation (head orientation) in relation to the surroundings, most easily defined by the common direction of the eyes when the eyes are looking straight ahead. That is, the head orientation tells the yaw, pitch and roll of the head in respect of a coordinate system of the scene where the user is.

In the setup of FIG. 1a, the spheres A1 and A2 are in the field of view of both eyes. The center-point $O_{12}$ between the eyes and the spheres are on the same line. That is, from the center-point, the sphere A2 is behind the sphere A1. However, each eye sees part of sphere A2 from behind A1, because the spheres are not on the same line of view from either of the eyes.

Figure 1B:
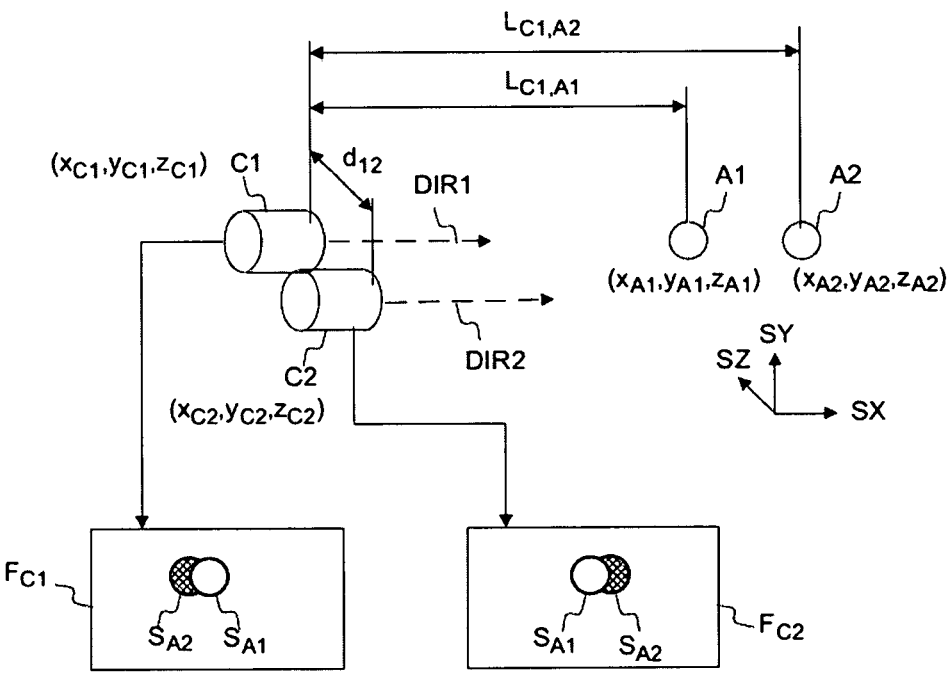

In FIG. 1b, there is a setup shown, where the eyes have been replaced by cameras C1 and C2, positioned at the location where the eyes were in FIG. 1a. The distances and directions of the setup are otherwise the same. Naturally, the purpose of the setup of FIG. 1b is to be able to take a stereo image of the spheres A1 and A2. The two images resulting from image capture are $F_{C1}$ and $F_{C2}$. The "left eye" image $F_{C1}$ shows the image $SA_2$ of the sphere A2 partly visible on the left side of the image $S_{A1}$ of the sphere A1. The "right eye" image $F_{C2}$ shows the image $S_{A2}$ of the sphere A2 partly visible on the right side of the image $S_{A1}$ of the sphere A1. This difference between the right and left images is called disparity, and this disparity, being the basic mechanism with which the human visual system determines depth information and creates a 3D view of the scene, can be used to create an illusion of a 3D image.

Figure 1C:
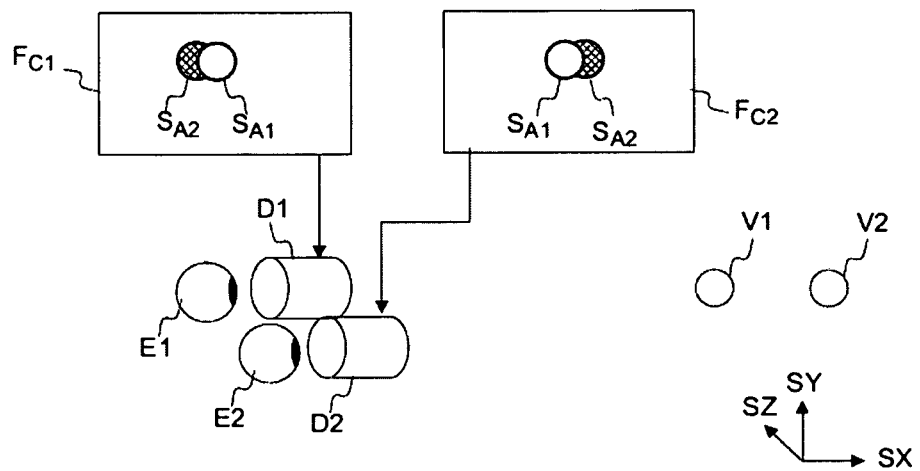

In FIG. 1c, the creating of this 3D illusion is shown. The images $F_{C1}$ and $F_{C2}$ captured by the cameras C1 and C2 are displayed to the eyes E1 and E2, using displays D1 and D2, respectively. The disparity between the images is processed by the human visual system so that an understanding of depth is created. That is, when the left eye sees the image $S_{A2}$ of the sphere A2 on the left side of the image $S_{A1}$ of sphere A1, and respectively the right eye sees the image of A2 on the right side, the human visual system creates an understanding that there is a sphere V2 behind the sphere V1 in a three-dimensional world. Here, it needs to be understood that the images $F_{C1}$ and $F_{C2}$ can also be synthetic, that is, created by a computer. If they carry the disparity information, synthetic images will also be seen as three-dimensional by the human visual system. That is, a pair of computer-generated images can be formed so that they can be used as a stereo image.

Figure 1D:
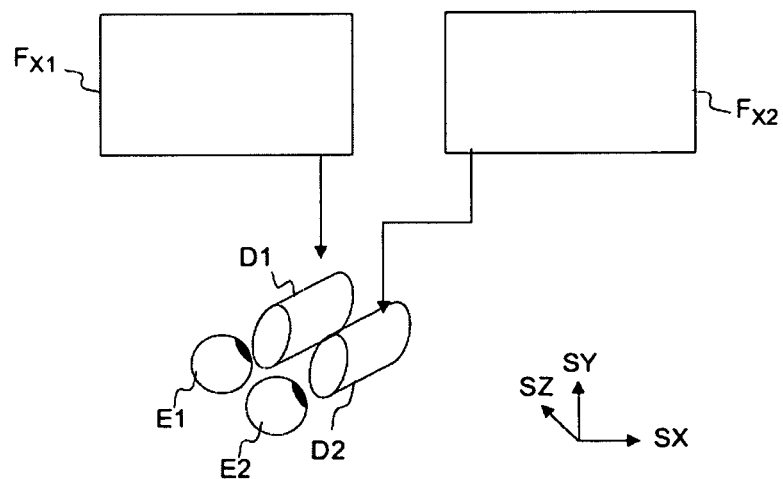

FIG. 1d illustrates how the principle of displaying stereo images to the eyes can be used to create 3D movies or virtual reality scenes having an illusion of being three-dimensional. The images $F_{X1}$ and $F_{X2}$ are either captured with a stereo camera or computed from a model so that the images have the appropriate disparity. By displaying a large number (e.g. 30) frames per second to both eyes using display D1 and D2 so that the images between the left and the right eye have disparity, the human visual system will create a cognition of a moving, three-dimensional image. When the camera is turned, or the direction of view with which the synthetic images are computed is changed, the change in the images creates an illusion that the direction of view is changing, that is, the viewer is rotating. This direction of view, that is, the head orientation, may be determined as a real orientation of the head e.g. by an orientation detector mounted on the head, or as a virtual orientation determined by a control device such as a joystick or mouse that can be used to manipulate the direction of view without the user actually moving his head. That is, the term "head orientation" may be used to refer to the actual, physical orientation of the user's head and changes in the same, or it may be used to refer to the virtual direction of the user's view that is determined by a computer program or a computer input device.

Figure 2A:
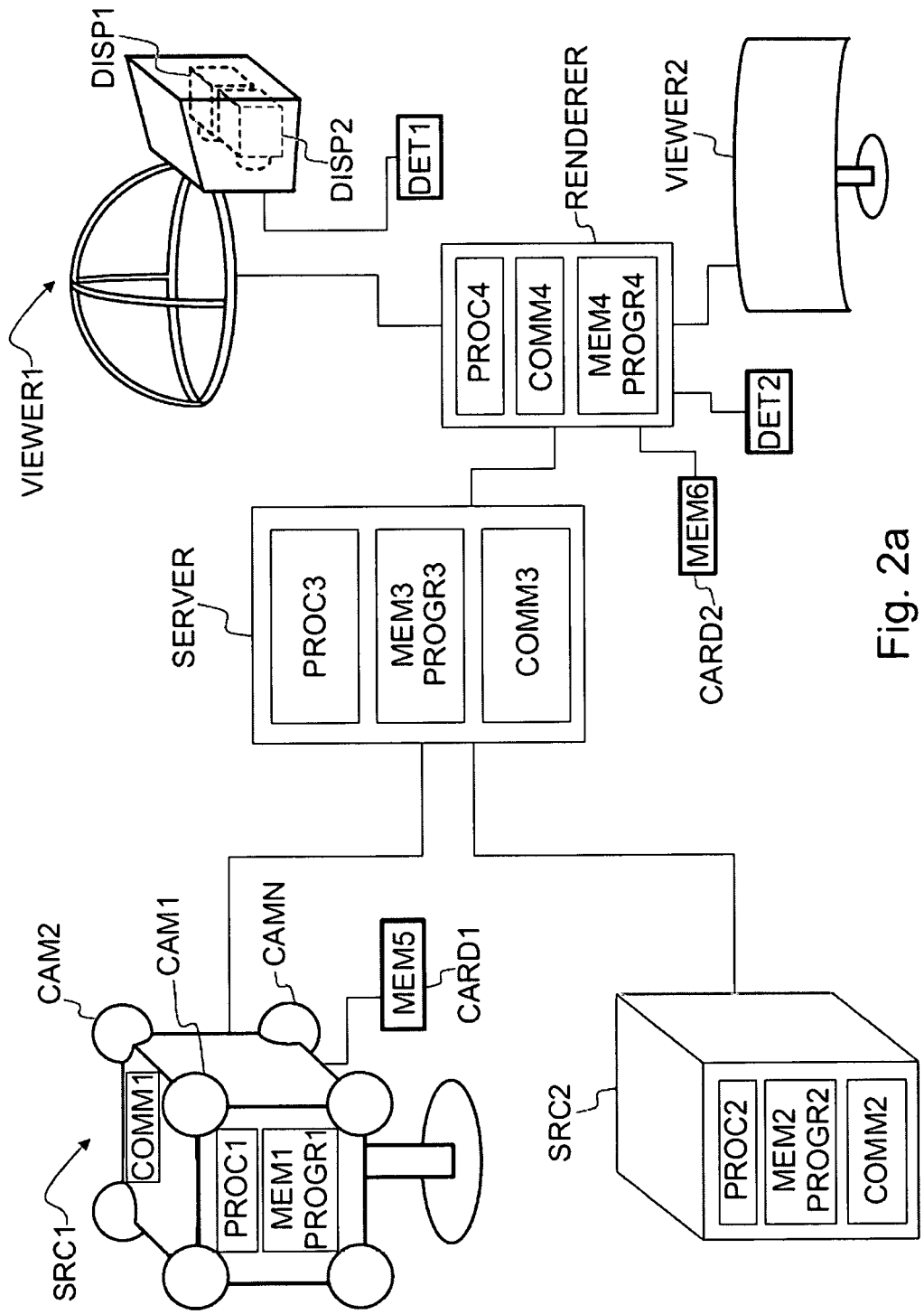
FIG. 2a shows a system and apparatuses for stereo viewing.

FIG. 2a shows a system and apparatuses for stereo viewing, that is, for 3D video and 3D audio digital capture and playback. The task of the system is that of capturing sufficient visual and auditory information from a specific location such that a convincing reproduction of the experience, or presence, of being in that location can be achieved by one or more viewers physically located in different locations and optionally at a time later in the future. Such reproduction requires more information than can be captured by a single camera or microphone, in order that a viewer can determine the distance and location of objects within the scene using their eyes and their ears. As explained in the context of FIGS. 1a to 1d, to create a pair of images with disparity, two camera sources are used. In a similar manned, for the human auditory system to be able to sense the direction of sound, at least two microphones are used (the commonly known stereo sound is created by recording two audio channels). The human auditory system can detect the cues e.g. in timing difference of the audio signals to detect the direction of sound.

The system of FIG. 2a may consist of three main parts: image sources, a server and a rendering device. A video capture device SRC1 comprises multiple (for example, 8) cameras CAM1, CAM2, . . . , CAMN with overlapping field of view so that regions of the view around the video capture device is captured from at least two cameras. The device SRC1 may comprise multiple microphones to capture the timing and phase differences of audio originating from different directions. The device may comprise a high resolution orientation sensor so that the orientation (direction of view) of the plurality of cameras can be detected and recorded. The device SRC1 comprises or is functionally connected to a computer processor PROC1 and memory MEM1, the memory comprising computer program PROGR1 code for controlling the capture device. The image stream captured by the device may be stored on a memory device MEM2 for use in another device, e.g. a viewer, and/or transmitted to a server using a communication interface COMM1.

Alternatively or in addition to the video capture device SRC1 creating an image stream, or a plurality of such, one or more sources SRC2 of synthetic images may be present in the system. Such sources of synthetic images may use a computer model of a virtual world to compute the various image streams it transmits. For example, the source SRC2 may compute N video streams corresponding to N virtual cameras located at a virtual viewing position. When such a synthetic set of video streams is used for viewing, the viewer may see a three-dimensional virtual world, as explained earlier for FIG. 1d. The device SRC2 comprises or is functionally connected to a computer processor PROC2 and memory MEM2, the memory comprising computer program PROGR2 code for controlling the synthetic source device SRC2. The image stream captured by the device may be stored on a memory device MEMS (e.g. memory card CARD1) for use in another device, e.g. a viewer, or transmitted to a server or the viewer using a communication interface COMM2.

There may be a storage, processing and data stream serving network in addition to the capture device SRC1. For example, there may be a server SERV or a plurality of servers storing the output from the capture device SRC1 or computation device SRC2. The device comprises or is functionally connected to a computer processor PROC3 and memory MEM3, the memory comprising computer program PROGR3 code for controlling the server. The server may be connected by a wired or wireless network connection, or both, to sources SRC1 and/or SRC2, as well as the viewer devices VIEWER1 and VIEWER2 over the communication interface COMM3.

For viewing the captured or created video content, there may be one or more viewer devices VIEWER1 and VIEWER2. These devices may have a rendering module and a display module, or these functionalities may be combined in a single device. The devices may comprise or be functionally connected to a computer processor PROC4 and memory MEM4, the memory comprising computer program PROGR4 code for controlling the viewing devices. The viewer (playback) devices may consist of a data stream receiver for receiving a video data stream from a server and for decoding the video data stream. The data stream may be received over a network connection through communications interface COMM4, or from a memory device MEM6 like a memory card CARD2. The viewer devices may have a graphics processing unit for processing of the data to a suitable format for viewing as described with FIGS. 1c and 1d. The viewer VIEWER1 comprises a high-resolution stereo-image head-mounted display for viewing the rendered stereo video sequence. The head-mounted device may have an orientation sensor DET1 and stereo audio headphones. The viewer VIEWER2 comprises a display enabled with 3D technology (for displaying stereo video), and the rendering device may have a head-orientation detector DET2 connected to it. Any of the devices (SRC1, SRC2, SERVER, RENDERER, VIEWER1, VIEWER2) may be a computer or a portable computing device, or be connected to such. Such rendering devices may have computer program code for carrying out methods according to various examples described in this text.

Figure 2B:
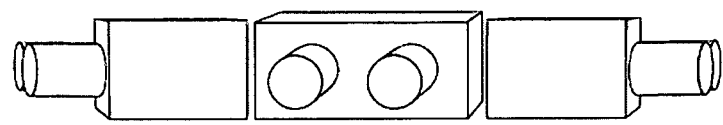
FIG. 2b shows a stereo camera device for stereo viewing.

FIG. 2b shows a camera device for stereo viewing. The camera comprises three or more cameras that are configured into camera pairs for creating the left and right eye images, or that can be arranged to such pairs. The distance between cameras may correspond to the usual distance between the human eyes. The cameras may be arranged so that they have significant overlap in their field-of-view. For example, wide-angle lenses of 180 degrees or more may be used, and there may be 3, 4, 5, 6, 7, 8, 9, 10, 12, 16 or 20 cameras. The cameras may be regularly or irregularly spaced across the whole sphere of view, or they may cover only part of the whole sphere. For example, there may be three cameras arranged in a triangle and having a different directions of view towards one side of the triangle such that all three cameras cover an overlap area in the middle of the directions of view. As another example, 8 cameras having wide-angle lenses and arranged regularly at the corners of a virtual cube and covering the whole sphere such that the whole or essentially whole sphere is covered at all directions by at least 3 or 4 cameras. In FIG. 2b, three stereo camera pairs are shown.

Figure 2C:
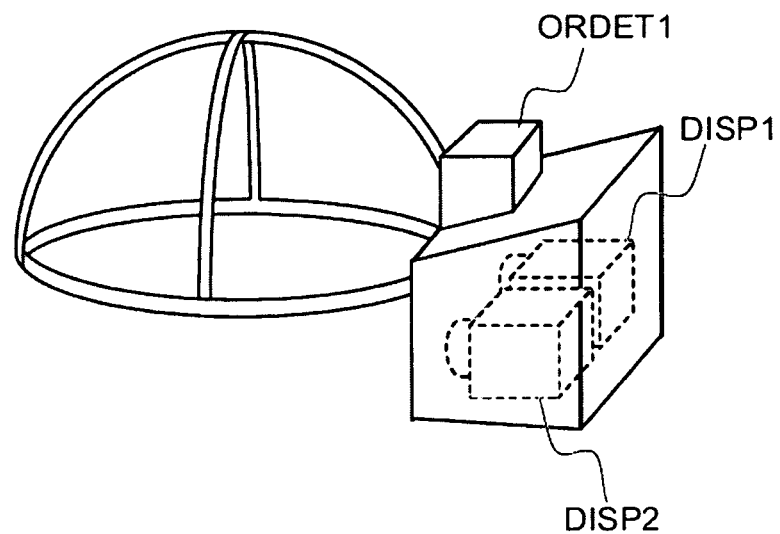
FIG. 2c shows a head-mounted display for stereo viewing.

FIG. 2c shows a head-mounted display for stereo viewing. The head-mounted display contains two screen sections or two screens DISP1 and DISP2 for displaying the left and right eye images. The displays are close to the eyes, and therefore lenses are used to make the images easily viewable and for spreading the images to cover as much as possible of the eyes' field of view. The device is attached to the head of the user so that it stays in place even when the user turns his head. The device may have an orientation detecting module ORDET1 for determining the head movements and direction of the head. It is to be noted here that in this type of a device, tracking the head movement may be done, but since the displays cover a large area of the field of view, eye movement detection is not necessary. The head orientation may be related to real, physical orientation of the user's head, and it may be tracked by a sensor for determining the real orientation of the user's head. Alternatively or in addition, head orientation may be related to virtual orientation of the user's view direction, controlled by a computer program or by a computer input device such as a joystick. That is, the user may be able to change the determined head orientation with an input device, or a computer program may change the view direction (e.g. in gaming, the game program may control the determined head orientation instead or in addition to the real head orientation.

Figure 2D:
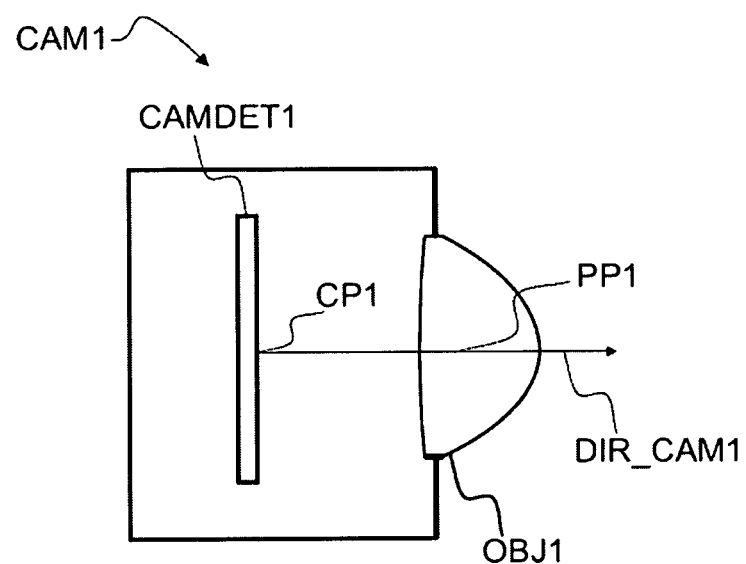
FIG. 2d illustrates a camera device.

FIG. 2d illustrates a camera device CAM1. The camera device has a camera detector CAMDET1, comprising a plurality of sensor elements for sensing intensity of the light hitting the sensor element. The camera device has a lens OBJ1 (or a lens arrangement of a plurality of lenses), the lens being positioned so that the light hitting the sensor elements travels through the lens to the sensor elements. The camera detector CAMDET1 has a nominal center point CP1 that is a middle point of the plurality sensor elements, for example for a rectangular sensor the crossing point of the diagonals. The lens has a nominal center point PP1, as well, lying for example on the axis of symmetry of the lens. The direction of orientation of the camera is defined by the half-line passing from the center point CP1 of the camera sensor and the center point PP1 of the lens.

The system described above may function as follows. Time-synchronized video, audio and orientation data is first recorded with the capture device. This can consist of multiple concurrent video and audio streams as described above. These are then transmitted immediately or later to the storage and processing network for processing and conversion into a format suitable for subsequent delivery to playback devices. The conversion can involve post-processing steps to the audio and video data in order to improve the quality and/or reduce the quantity of the data while preserving the quality at a desired level. Finally, each playback device receives a stream of the data from the network, and renders it into a stereo viewing reproduction of the original location which can be experienced by a user with the head mounted display and headphones.

With a novel way to create the stereo images for viewing as described below, the user may be able to turn their head in multiple directions, and the playback device is able to create a high-frequency (e.g. 60 frames per second) stereo video and audio view of the scene corresponding to that specific orientation as it would have appeared from the location of the original recording.

Figure 3A:
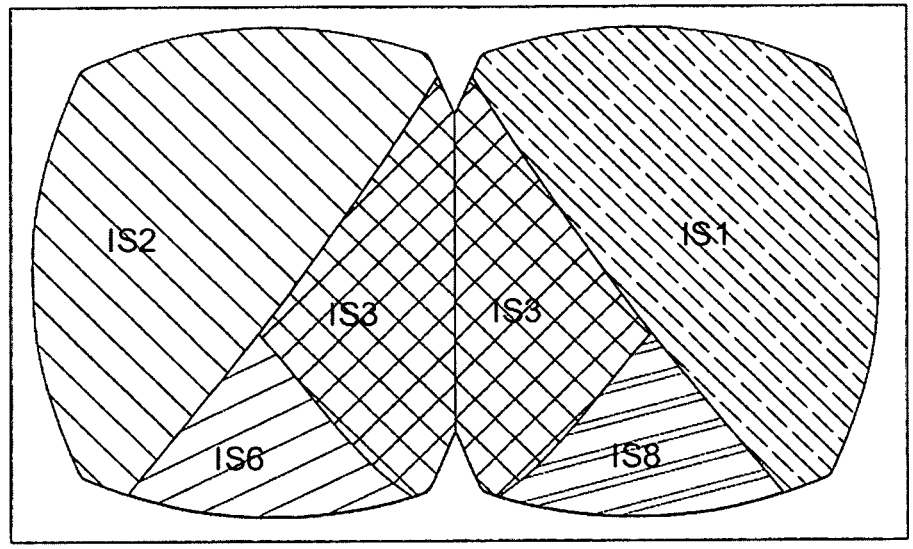
FIGS. 3a, 3b and 3c
i. illustrate forming stereo images for first and second eye from image sources.
Figure 3B:
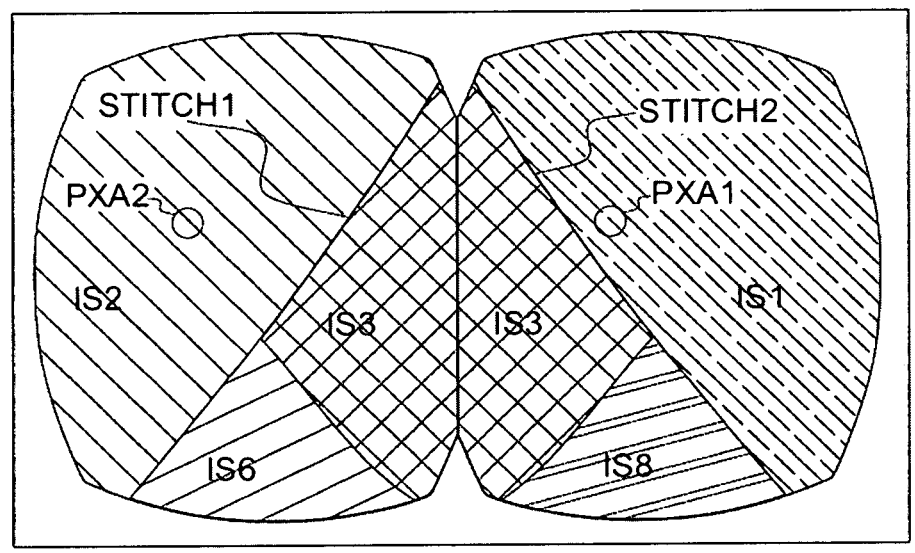
Figure 3C:
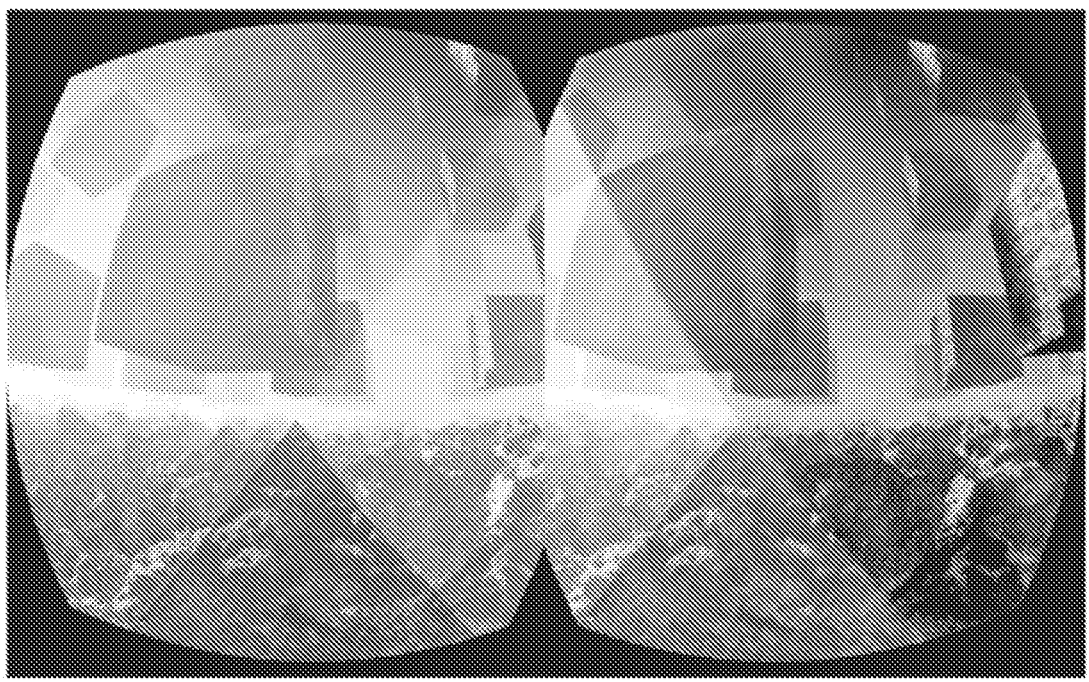

FIGS. 3a, 3b and 3c illustrate forming stereo images for first and second eye from image sources by using dynamic source selection and dynamic stitching location. In order to create a stereo view for a specific head orientation, image data from at least 2 different cameras is used. Typically, a single camera is not able to cover the whole field of view. Therefore, according to the present solution, multiple cameras may be used for creating both images for stereo viewing by stitching together sections of the images from different cameras. The image creation by stitching happens so that the images have an appropriate disparity so that a 3D view can be created. This will be explained in the following.

For using the best image sources, a model of camera and eye positions is used. The cameras may have positions in the camera space, and the positions of the eyes are projected into this space so that the eyes appear among the cameras. A realistic parallax (distance between the eyes) is employed. For example, in an 8-camera regular setup, where all the cameras are located on a sphere regularly spaced, the eyes may be projected on the sphere, as well. The solution first selects the closest camera to each eye. Head-mounted-displays can have a large field of view per eye such that there is no single image (from one camera) which covers the entire view of an eye. In this case, a view must be created from parts of multiple images, using a known technique of "stitching" together images along lines which contain almost the same content in the two images being stitched together. FIG. 3a shows the two displays for stereo viewing. The image of the left eye display is put together from image data from cameras IS2, IS3 and IS6. The image of the right eye display is put together from image data from cameras IS1, IS3 and IS8. Notice that the same image source IS3 is in this example used for both the left eye and the right eye image, but this is done so that the same region of the view is not covered by camera IS3 in both eyes. This ensures proper disparity across the whole view—that is, at each location in the view, there is a disparity between the left and right eye images.

The stitching point is changed dynamically for each head orientation to maximize the area around the central region of the view that is taken from the nearest camera to the eye position. At the same time, care is taken to ensure that different cameras are used for the same regions of the view in the two images for the different eyes. In FIG. 3b, the regions PXA1 and PXA2 that correspond to the same area in the view are taken from different cameras IS1 and IS2, respectively. The two cameras are spaced apart, so the regions PXA1 and PXA2 show the effect of disparity, thereby creating a 3D illusion in the human visual system. Seams (which can be more visible) STITCH1 and STITCH2 are also avoided from being positioned in the center of the view, because the nearest camera will typically cover the area around the center. This method leads to dynamic choosing of the pair of cameras to be used for creating the images for a certain region of the view depending on the head orientation. The choosing may be done for each pixel and each frame, using the detected head orientation.

The stitching is done with an algorithm ensuring that all stitched regions have proper stereo disparity. In FIG. 3c, the left and right images are stitched together so that the objects in the scene continue across the areas from different camera sources. For example, the closest cube in the scene has been taken from one camera to the left eye image, and from two different cameras to the right eye view, and stitched together. There is a different camera used for all parts of the cube for the left and the right eyes, which creates disparity (the right side of the cube is more visible in the right eye image).

The same camera image may be used partly in both left and right eyes but not for the same region. For example the right side of the left eye view can be stitched from camera IS3 and the left side of the right eye can be stitched from the same camera IS3, as long as those view areas are not overlapping and different cameras (IS1 and IS2) are used for rendering those areas in the other eye. In other words, the same camera source (in FIG. 3a, IS3) may be used in stereo viewing for both the left eye image and the right eye image. In traditional stereo viewing, on the contrary, the left camera is used for the left image and the right camera is used for the right image. Thus, the present method allows the source data to be utilized more fully. This can be utilized in the capture of video data, whereby the images captured by different cameras at different time instances (with a certain sampling rate like 30 frames per second) are used to create the left and right stereo images for viewing. This may be done such a manner that the same camera image captured at a certain time instance is used for creating part of an image for the left eye and part of an image for the right eye, the left and right eye images being used together to form one stereo frame of a stereo video stream for viewing. At different time instances, different cameras may be used for creating part of the left eye and part of the right eye frame of the video. This enables much more efficient use of the captured video data.

Figure 4A:
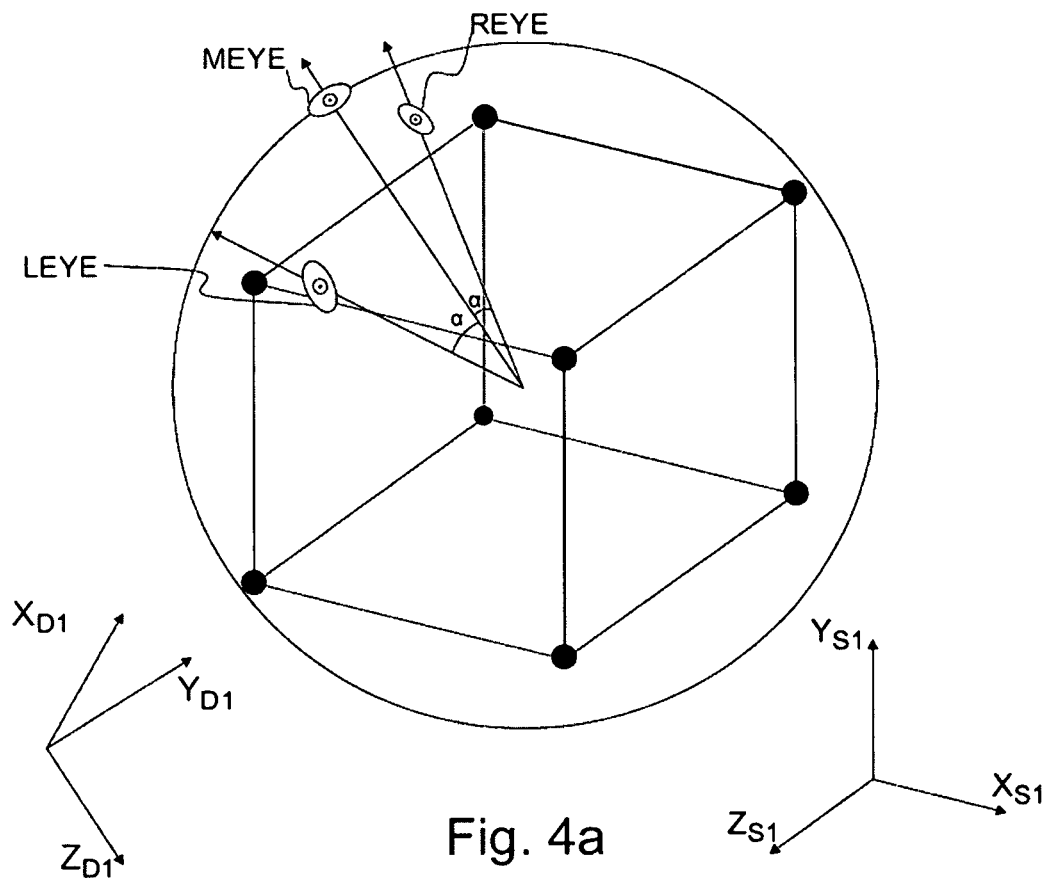
FIGS. 4a, 4b, 4c, 4d and 4e
i. illustrate selection of image sources for creation of stereo images when head orientation is changing.
Figure 4B:
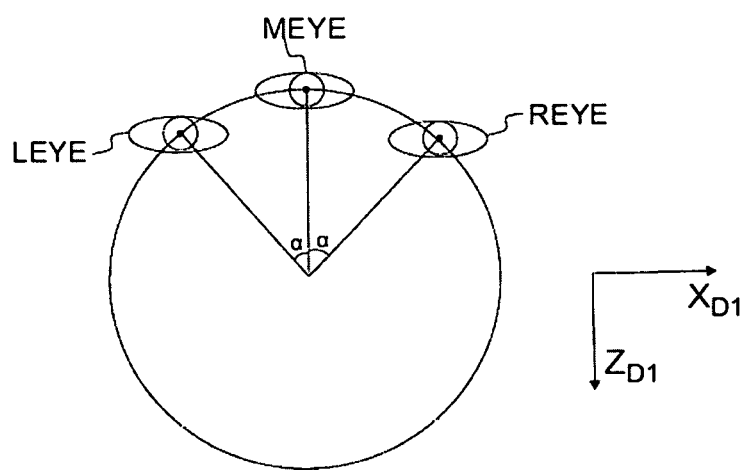

FIGS. 4a and 4b illustrate a model for selecting the closest cameras for different head orientations. As an example (see FIG. 4a), all sources (cameras) are arranged around a center point so that their positions form an octahedron and their distance from the center point is equal. This corresponds to an 8-camera device with regular inter-camera spacing. The sources have certain x, y and z coordinates in 3d space. The sources are pointed directly away from the center point (orientation of sources is explained in context of FIG. 2d). The head-mounted device reports roll, pitch and yaw of the viewer's head, and these may be used to transform the sources' coordinates in order to render them relatively to the head coordinate system. Alternatively, the coordinates of the eyes may be transformed to the sources' coordinate system. Yet further, the sources' coordinate system may be transformed to a normalized coordinate system, and the head coordinate system may be transformed to this same normalized coordinate system, too. Thus, both the sources and the eyes are positioned in the same model with respect to each other.

In other words, locations of a first and a second virtual eye corresponding to said eyes of the user are determined in a coordinate system using the head orientation, and then the image sources are selected based on the locations of the virtual eyes with respect to image source locations in the coordinate system.

An example of a rotational transformation $R_x$ of coordinates around the x-axis by an angle γ (also known as pitch angle) is defined by a rotational matrix $$R_x = \begin{pmatrix} 1 & 0 & 0 \\ 0 & \cos\gamma & -\sin\gamma \\ 0 & \sin\gamma & \cos\gamma \end{pmatrix}.$$

In a similar manner rotations $R_y$ (for yaw) and $R_z$ (for roll) around the different axes can be formed. As a general rotation, a matrix multiplication of the three rotations by $R=R_x R_y R_z$ can be formed. This rotation matrix can then be used to multiply any vector in a first coordinate system according to $v_2 = R \, v_1$ to obtain the vector in the destination coordinate system.

An example of transforming the source and eye coordinates is given in the following. All vectors are vectors in three-dimensional space and described as (x, y, z). The origin is in (0, 0, 0). All image sources have an orientation defined by yaw, pitch and roll around the origin.

For each source, the position vector is calculated:
Create a position vector for the source and initialize it with (0, 0, 1)
Make an identity transformation matrix
Multiply the matrix by another that rotates coordinates around the y-axis by the amount of yaw
Multiply the matrix by another that rotates coordinates around the x-axis by the amount of pitch
Multiply the matrix by another that rotates coordinates around the z-axis by the amount of roll
Transform the position vector with matrix multiplication using the matrix, the matrix applied from the left in the multiplication.

For an eye, calculate the position vector:
Create a position vector for the eye and initialize it with (0, 0, 1)
Take the view matrix that is used for rendering the sources according to the viewing direction (head orientation) and invert it. (To illustrate why the view matrix is inverted, for example when the viewing direction is rotated 10 degrees around y axis, the sources need to be rotated −10 degrees around y-axis. In a similar manner, if one looks at an object and rotates his head right, the object in your view moves to left. Therefore the rotation we apply to the imagined eye position may be taken as the inverse of the rotation we apply to the sources/view.)
Rotate the inverted view matrix around the y-axis (the axis that points up in the head coordinate system) according to the simulated eye disparity (as described below).
Transform the position vector according to the resulting matrix, with the matrix applied pre-vector.
Calculate the distance between the eye position and the sources and pick the shortest distance (see below).

An imagined position of an eye (left or right) is positioned to equal distance from the center point than the cameras are, and rotated around the center point around all x, y and z axes according to the relative orientation of the viewer's head-mounted device compared to the capture device's orientation. As shown in FIGS. 4a and 4b, this results in the position of an imaginary middle eye MEYE in the middle of the face (corresponding to $O_{12}$ of FIG. 1a). The position of the viewer's imaginary middle eye is then rotated around the view's y-axis (aligned with the viewer's head, from the chin to the top of the head) to get the position of the virtual left eye LEYE or right eye REYE. To simulate the disparity of human eyes, depending on whether the view is for the left or right eye, this rotation is done to corresponding direction. The angle between the virtual left and right eye may be between 80 and 120 degrees, e.g. approximately 100 degrees. Larger angles than 90 degrees may prevent picking of the same camera for the same region for both eyes, and smaller angles than 110 degrees may prevent cameras with too large inter-camera distance to be picked.

The sources (e.g. cameras) are the ordered according to the distance between the source and the virtual eye and the view is rendered so that pixels are picked from a source that, respectively: A) Covers that pixel B) Has the smallest distance to the virtual eye when compared against all the sources that fulfill condition A. In other words, an image source for a pixel of an image for a first eye of the user is determined to be a close image source that satisfies a closeness criterion (e.g. being the closest source) to a virtual eye corresponding to said first eye, where the close image source captures the scene portion corresponding to the pixel. If the close image source does not capture the scene portion corresponding to the pixel, an image source for a pixel of an image for the first eye of the user is selected to be another source than the close image source to said virtual eye corresponding to said first eye.

Figure 4C:
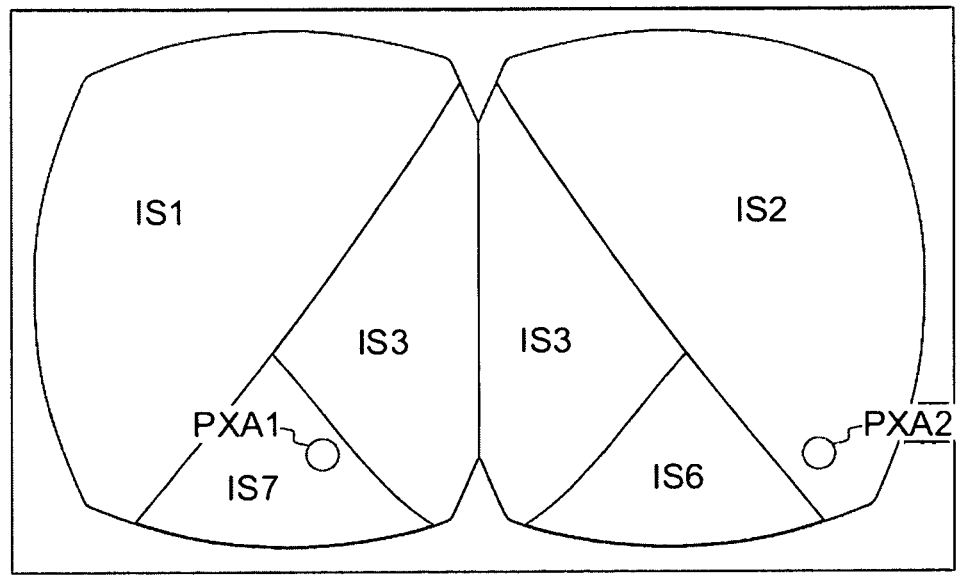
Figure 4D:
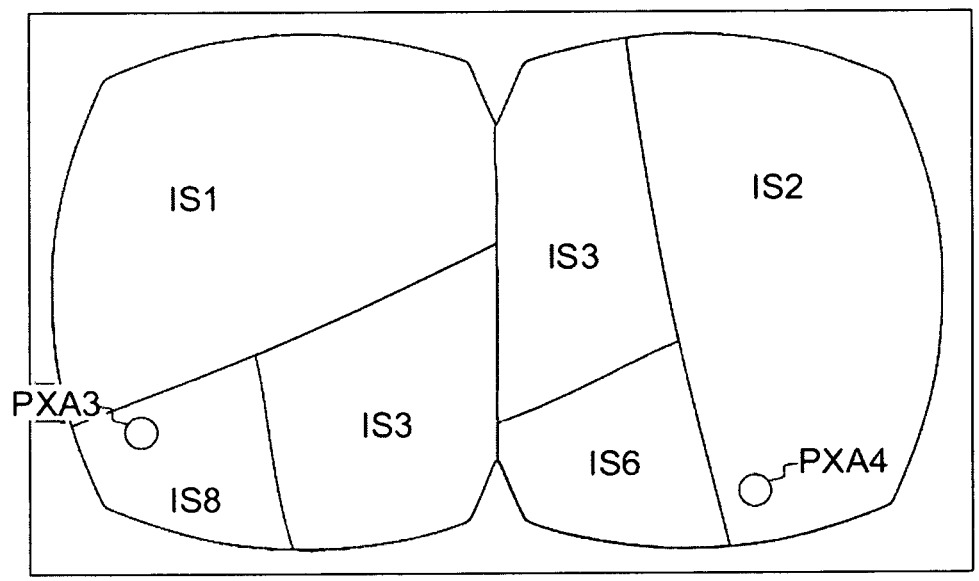

FIGS. 4c and 4d illustrate selection of image sources for creation of stereo images when head orientation is changing. The pixels are rendered from a source picked according to the following:

1. List all the sources that cover the current pixel
2. From all the sources on the list, pick the one that matches best what a person would see with that specific eye if his head would be positioned where the sources center point is and rotated according to the head-mounted display's (viewer's head) orientation
3. Adjust the imagined person's eye disparity to make sure that the source is not the same for the left and the right eye, and that the picked sources have a disparity as close as possible to the human eyes (e.g. 64 mm). The amount of this adjustment depends on the available sources and their positions. The adjustment may be done beforehand, as well. If the closest camera for the first eye has been found e.g. 10 degrees lower in pitch than the first eye, the closest second eye may also be rotated 10 degrees lower in pitch. This may be done to at least in some cases avoid tilting (creating a roll) the parallax line between the cameras that would result from the other eye picking a camera that is higher in pitch.

The virtual positions may be pre-mapped with a lookup table to closest camera lists, and the mapping may have a granularity e.g. 1 mm inside which all positions share the same list. When the pixels for the images to be displayed are being rendered, a stencil buffer may be employed so that the pixels from the closest camera are rendered first and marked in the stencil buffer as rendered. Then, a stencil test is carried out to determine the non-rendered pixels that can be rendered from the next closest camera, the pixels from the next closest are rendered and marked, and so on, until the whole image has been rendered. That is, regions of an image for an eye are rendered so that the regions correspond to image sources, wherein the regions are rendered in order of closeness of the image sources to a virtual eye corresponding to said eye in image source coordinate system.

In order to create smooth "seam" (spatial transition) from one camera area to another, the edge region of a camera may be rendered using alpha channel rendering as follows. For each pixel, the (red-green-blue) color values of the pixel is computed from the source color values of source pixels, e.g. by interpolation or by using the color values of the closest source pixel. For most pixels, the alpha value (opaqueness) is one. For the pixels on the edge of the source, the alpha value may be set to less than one. This means that the color values from the next overlapping source and the earlier computed color values are mixed, creating a smoother stitch. For the edge areas, rendering may thus start from the furthest camera that covers the pixel. That is, regions of the images may be combined by blending the edge areas of the regions.

In the above, two optional optimizations, namely the use of stencil buffer and alpha channel smoothing have been described. In this manner, the functionalities of a graphics processor may be utilized.

Figure 4E:
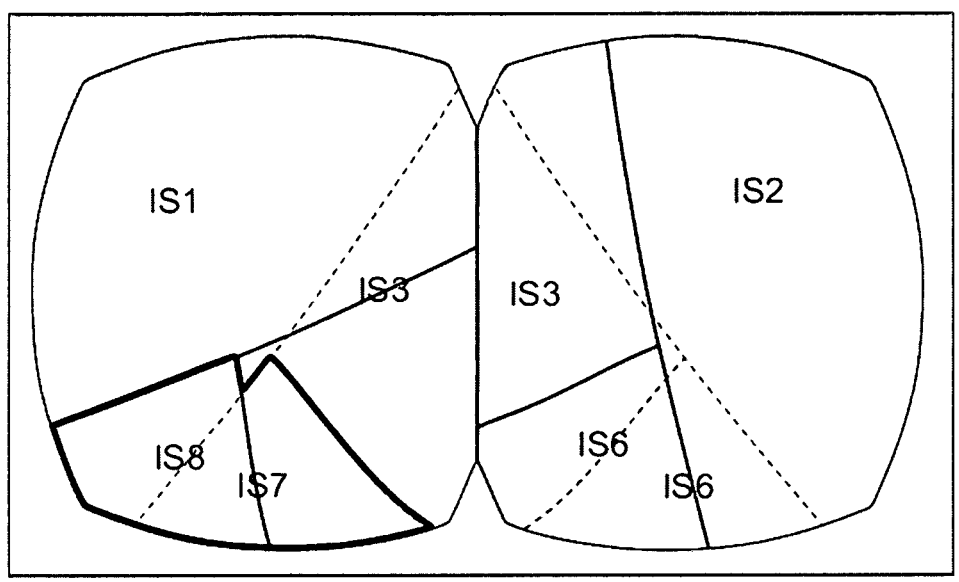

FIGS. 4c, 4d and 4e illustrate selection of image sources for creation of stereo images when head orientation is changing. In FIG. 4c, the head orientation of the user is determined to obtain a first head orientation. Then, a first image source (IS7) and a second image source (IS2) are selected based on the first head orientation so that the first and second image source form a stereo image source, as has been explained above. In the scene, there may be understood to be a virtual region that corresponds to a certain detail of the scene. In the left and right eye images, there is a corresponding region of pixels (PXA1 and PXA2) that represent the scene region. Color values of a first region of pixels (PXA1) corresponding to a first region of a scene are determined using the first image source (IS7), and the color values of this first region of pixels are formed into the left eye image. Color values of a second region of pixels (PXA2) corresponding to the same region of the scene are formed using second image source (IS2), and the color values of this second region of pixels are formed into the right eye image.

When the user turns his head (there is rotation represented by pitch, yaw and roll values), the head orientation of the user is determined again to obtain a second head orientation. This may happen e.g. so that there is a head movement detector in the head-mounted display. To form image regions corresponding to the first scene region, image sources are again chosen, as shown in FIG. 4d. Because the head has turned, the second image source (IS2) and now a third image source (IS8) are chosen based on the second head orientation, the second and third image source forming a stereo image source. This is done as explained above. Color values of a third region of pixels (PXA3) corresponding to the first region of a scene are formed using the third image source (IS8), the color values of the third region of pixels (PXA3) being formed into a third image for displaying to the left eye. Color values of a fourth region of pixels (PXA4) corresponding to the same first region of a scene are still formed using the second image source (IS2), the color values of the fourth region of pixels being formed into a fourth image for displaying to the right eye.

In this manner, the detected or determined head orientation affects the choosing of image sources that are used to form an image for an eye. The pair of image sources (cameras) used to create the stereo image of a region of a scene may change from one time instance to another if the user turns his head or the camera view is rotated. This is because the same image source may not be the closest image source to the (virtual) eye at all times.

When reproducing a stereo view for a specific view orientation based on input from multiple cameras the key is to have parallax between the cameras. It has been noticed that this parallax however may cause a jump in the image region (and the disparity) between two successive frames when the camera pair for the image region changes due to a change in the viewing angle (head orientation). This jump can disturb the viewer and reduce the fidelity of the reproduction. In FIG. 4c, the left image is rendered from cameras IS1, IS3 and IS7, and the right image from cameras IS2, IS3 and IS6. When the user tilts his head to the left, the images are made to naturally rotate counterclockwise. However, the position of the eyes with respect to the sources is also changing. In FIG. 4d, one camera (IS7) has been changed (to IS8) for the left image. The image from IS7 is slightly different from IS8, and thus, when the user tilts his head, the camera change may cause a noticeable change in the disparity in the lower part of the image.

A technique used in this solution is to cross-blend during multiple rendered frames between the two camera pairs, adjusting the timing and duration of the cross-blend according to the angular velocity of the viewing direction. The aim is to do the cross-blended jump when the viewing direction is changing rapidly as then there is natural motion blur already and the user is not focused on any specific point. The duration of the cross-blend may also be adjusted according to the angular velocity so that in slow motion the cross-blend is done over longer period of time and in faster motion the cross-blend duration is shorter. This method reduces the visibility of the jump from a one camera pair to another. The cross-blending can be achieved by weighted summing of the affected image region values. For example, as shown in FIG. 4e, the area to be blended may be chosen to be the combined area of IS7 and IS8. The area may also be chosen to be the area of IS8 only or IS7 only. This method has been evaluated to reduce the noticeability of the jump from a camera pair to another, especially when viewed with a head mounted display. In other words, to improve video image quality, a temporal transition may be created by blending from an image formed using a first image source to an image using another image source. The duration of the temporal transition blending may be adjusted by using information on head movement speed, e.g. angular velocity.

In the change of the source, a hysteresis of change may be applied. By hysteresis it is meant that once a change in source from a first source to a second source has been applied due to a determination that the second source is closer to a virtual eye than the first source, a change back to the first source is not made as easily as the first change. That is, if the head orientation returns to the orientation right before the change, a change back to the first source is not affected. Change back to the first source needs a larger change in head orientation so that the first source is clearly closer to a virtual eye than the second source. Such a use of hysteresis may be used to prevent flickering caused by rapid switching of cameras back and forth at the orientation where the first and second sources are almost as close to the virtual eye.

It needs to be understood that cross-blending may also happen so that the image sources for the whole area are changed, which results in the whole area to be cross-blended.

Figure 5A:
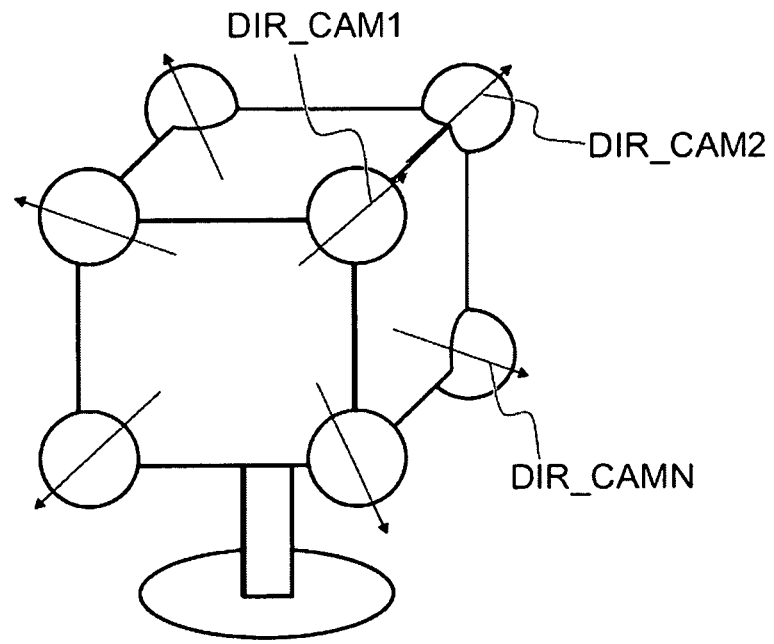
FIGS. 5a and 5b
i. show an example of a camera device for being used as an image source.
Figure 5B:
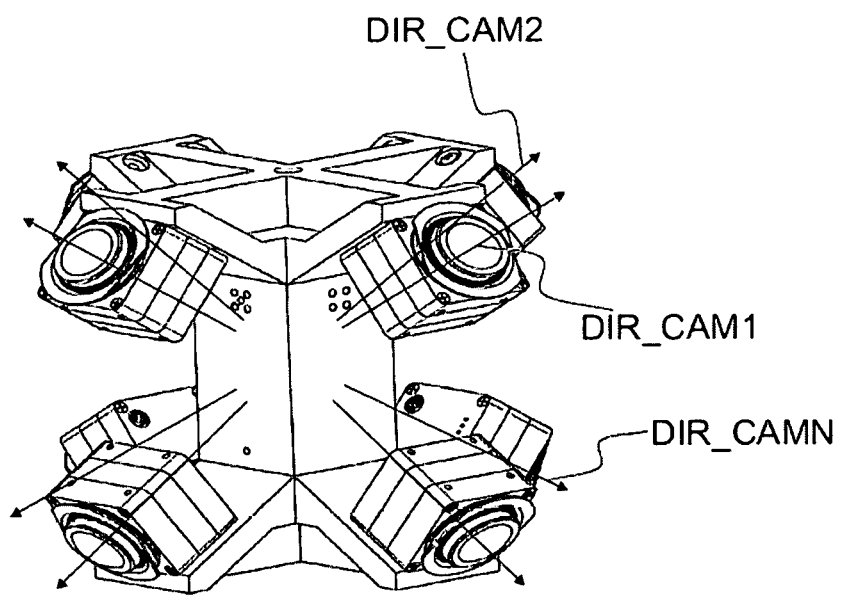

FIGS. 5a and 5b show an example of a camera device for being used as an image source.

To create a full 360 degree stereo panorama every direction of view needs to be photographed from two locations, one for the left eye and one for the right eye. In case of video panorama, these images need to be shot simultaneously to keep the eyes in sync with each other. As one camera cannot physically cover the whole 360 degree view, at least without being obscured by another camera, there need to be multiple cameras to form the whole 360 degree panorama. Additional cameras however increase the cost and size of the system and add more data streams to be processed. This problem becomes even more significant when mounting cameras on a sphere or platonic solid shaped arrangement to get more vertical field of view. However, even by arranging multiple camera pairs on for example a sphere or platonic solid such as octahedron or dodecahedron, the camera pairs will not achieve free angle parallax between the eye views. The parallax between eyes is fixed to the positions of the individual cameras in a pair, that is, in the perpendicular direction to the camera pair, no parallax can be achieved. This is problematic when the stereo content is viewed with a head mounted display that allows free rotation of the viewing angle around z-axis as well.

The requirement for multiple cameras covering every point around the capture device twice would require a very large number of cameras in the capture device. A novel technique used in this solution is to make use of lenses with a field of view of 180 degree (hemisphere) or greater and to arrange the cameras with a carefully selected arrangement around the capture device. Such an arrangement is shown in FIG. 5a, where the cameras have been positioned at the corners of a virtual cube, having orientations DIR_CAM1, DIR_CAM2, . . . , DIR_CAMN essentially pointing away from the center point of the cube.

Overlapping super wide field of view lenses may be used so that a camera can serve both as the left eye view of a camera pair and as the right eye view of another camera pair. This reduces the amount of needed cameras to half. As a surprising advantage, reducing the number of cameras in this manner increases the stereo viewing quality, because it also allows to pick the left eye and right eye cameras arbitrarily among all the cameras as long as they have enough overlapping view with each other. Using this technique with different number of cameras and different camera arrangements such as sphere and platonic solids enables picking the closest matching camera for each eye (as explained earlier) achieving also vertical parallax between the eyes. This is beneficial especially when the content is viewed using head mounted display. The described camera setup, together with the stitching technique described earlier, may allow to create stereo viewing with higher fidelity and smaller expenses of the camera device.

The wide field of view allows image data from one camera to be selected as source data for different eyes depending on the current view direction, minimizing the needed number of cameras. The spacing can be in a ring of 5 or more cameras around one axis in the case that high image quality above and below the device is not required, nor view orientations tilted from perpendicular to the ring axis.

In case high quality images and free view tilt in all directions is required, a platonic solid shape must be used, either a cube (with 6 cameras), octahedron (with 8 cameras) or dodecahedron (with 12 cameras). Of these, the octahedron, or the corners of a cube (FIG. 5a) is a good choice since it offers a good trade-off between minimizing the number of cameras while maximizing the number of camera-pairs combinations that are available for different view orientations. An actual camera device built with 8 cameras is shown in FIG. 5b. The camera device uses 185-degree wide angle lenses, so that the total coverage of the cameras is more than 4 full spheres. This means that all points of the scene are covered by at least 4 cameras. The cameras have orientations DIR_CAM1, DIR_CAM2, . . . , DIR_CAMN pointing away from the center of the device.

Even with fewer cameras, such over-coverage may be achieved, e.g. with 6 cameras and the same 185-degree lenses, coverage of 3× can be achieved. When a scene is being rendered and the closest cameras are being chosen for a certain pixel, this over-coverage means that there are always at least 3 cameras that cover a point, and consequently at least 3 different camera pairs for that point can be formed. Thus, depending on the view orientation (head orientation), a camera pair with a good parallax may be more easily found.

The camera device may comprise at least three cameras in a regular or irregular setting located in such a manner with respect to each other that any pair of cameras of said at least three cameras has a disparity for creating a stereo image having a disparity. The at least three cameras have overlapping fields of view such that an overlap region for which every part is captured by said at least three cameras is defined. Any pair of cameras of the at least three cameras may have a parallax corresponding to parallax of human eyes for creating a stereo image. For example, the parallax (distance) between the pair of cameras may be between 5.0 cm and 12.0 cm, e.g. approximately 6.5 cm. The at least three cameras may have different directions of optical axis. The overlap region may have a simply connected topology, meaning that it forms a contiguous surface with no holes, or essentially no holes so that the disparity can be obtained across the whole viewing surface, or at least for the majority of the overlap region. The field of view of each of said at least three cameras may approximately correspond to a half sphere. The camera device may comprise three cameras, the three cameras being arranged in a triangular setting, whereby the directions of optical axes between any pair of cameras form an angle of less than 90 degrees. The at least three cameras may comprise eight wide-field cameras positioned essentially at the corners of a virtual cube and each having a direction of optical axis essentially from the center point of the virtual cube to the corner in a regular manner, wherein the field of view of each of said wide-field cameras is at least 180 degrees, so that each part of the whole sphere view is covered by at least four cameras (see FIG. 5b).

Figure 5C:
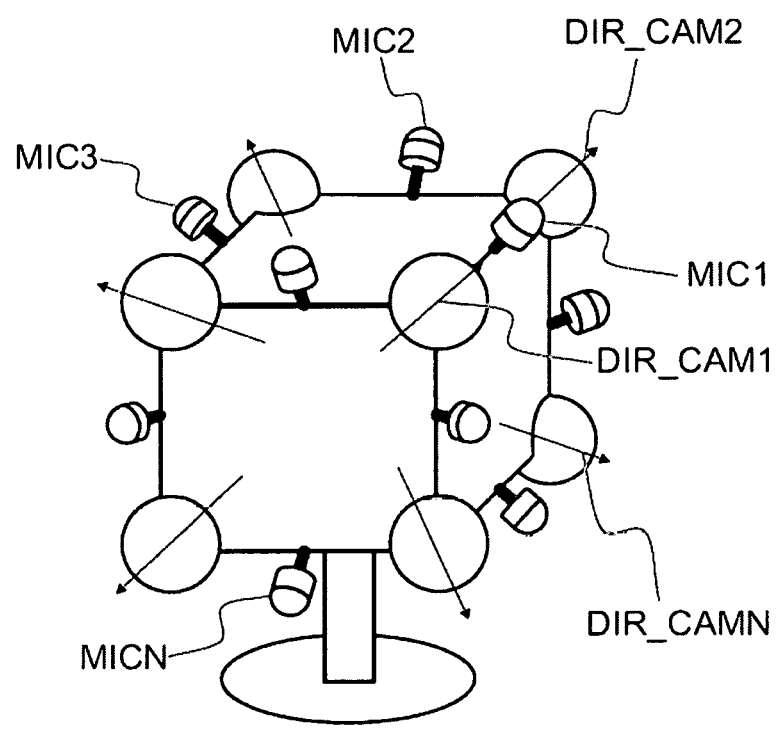
FIG. 5c shows an example of a microphone device for being used as an audio source.

FIG. 5c shows an example of a microphone device for being used as an audio source. A plurality of microphones MIC1, MIC2, MICN may be positioned around the center of the device, regularly or irregularly. For example, there may be 8-20 microphones positioned on the surface of a virtual sphere. In order to increase the experienced presence of a scene reproduction, a convincing stereo audio signal may be generated. The capture device may include multiple microphones capturing the sound field at multiple locations and from all directions around the device. Similar to the video rendering, these source streams can be used to render (for example using a head-related transfer function) a synthetic audio signal similar to the one that would have been heard when the ear would have been located at the place in the scene dictated by the position of the viewer's head.

A sound stream matching the position of the virtual ear may be created from the recordings of multiple microphones using multiple techniques. One technique is to choose a single original sound source closest to each virtual ear. However this gives spatial movement resolution limited to the original number of microphones. A better technique is to use well known audio beam-forming algorithms to combine the recordings from sets of 2 or more microphones and create synthetic intermediate audio streams corresponding to multiple focused lobes of space around the capture device. During rendering, these intermediate streams are then each filtered using a head-related transfer function (HRTF) corresponding to their current location relative to the virtual ear in a virtual head matching the current user head orientation, and then summed together to give a final simulated stream which matches more closely the stream that would have been heard by an ear at the same position as the virtual ear. A head-related transfer function (HRTF) is a transfer function that tells how a sound from a point in space is heard by an ear. Two head-related transfer functions (for the left and right ear) can be used to form a stereo sound that appears to come from a certain direction and distance. Multiple sound sources from different directions and distances can be simply summed up to obtain the combined stereo sound from these sources.

The orientation correction used for video described below is applied also to audio in order to optionally cancel out motion of the capture device if the viewer's head is not moving.

The immersive experience of 3D content viewed with a head mounted display comes from how the user is able to look around by turning his head and the content is seen correctly according to the head orientation. If the capture device has moved while capturing (for example when mounted to a helmet of a scuba diver or to a branch of a tree) the movement will affect the viewing angle of the user independently of the viewer' s head orientation. This has been noticed to break the immersion and make it hard for the user to focus on a certain point or viewing angle.

FIGS. 6a and 6b show the use of source and destination coordinate systems for stereo viewing. A technique used here is to record the capture device orientation synchronized with the overlapping video data, and use the orientation information to correct the orientation of the view presented to user—effectively cancelling out the rotation of the capture device during playback—so that the user is in control of the viewing direction, not the capture device. If the viewer instead wishes to experience the original motion of the capture device, the correction may be disabled. If the viewer wishes to experience a less extreme version of the original motion—the correction can be applied dynamically with a filter so that the original motion is followed but more slowly or with smaller deviations from the normal orientation.

FIGS. 6a and 6b illustrate the rotation of the camera device, and the rotation of the camera coordinate system (source coordinate system). Naturally, the view and orientation of each camera is changing, as well, and consequently, even though the viewer stays in the same orientation as before, he will see a rotation to the left. If at the same time, as shown in FIGS. 6c and 6d, the user were to rotate his head to the left, the resulting view would turn even more heavily to the left, possibly changing the view direction by 180 degrees. However, if the movement of the camera device is cancelled, the user's head movement (see FIGS. 6c and 6d) will be the one controlling the view. In the example of the scuba diver, the viewer can pick the objects to look at regardless of what the diver has been looking at. That is, the orientation of the image source is used together with the orientation of the head of the user to determine the images to be displayed to the user.

Figure 7A:
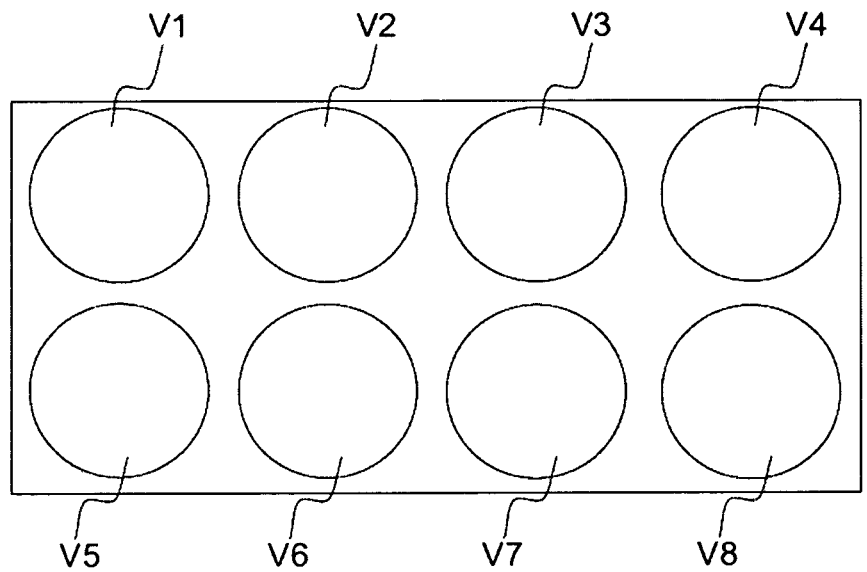
FIGS. 7a and 7b
i. illustrate transmission of image source data for stereo viewing.
Figure 7B:
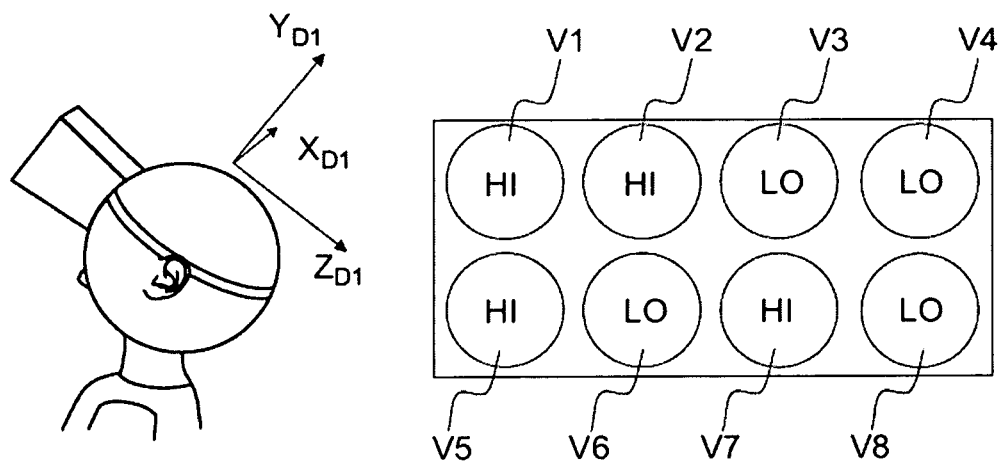

FIGS. 7a and 7b illustrate transmission of image source data for stereo viewing. The system of stereo viewing presented in this application may employ multi-view video coding for transmitting the source video data to the viewer. That is, the server may have an encoder, or the video data may be in encoded form at the server, such that the redundancies in the video data are utilized for reduction of bandwidth. However, due to the massive distortion caused by wide-angle lenses, the coding efficiency may be reduced. In such a case, the different source signals V1-V8 may be combined to one video signal as in FIG. 7a and transmitted as one coded video stream. The viewing device may then pick the pixel values it needs for rendering the images for the left and right eyes.

The video data for the whole scene may need to be transmitted (and/or decoded at the viewer), because during playback, the viewer needs to respond immediately to the angular motion of the viewer's head and render the content from the correct angle. To be able to do this the whole 360 degree panoramic video needs to be transferred from the server to the viewing device as the user may turn his head any time. This requires a large amount of data to be transferred that consumes bandwidth and requires decoding power.

A technique used in this application is to report the current and predicted future viewing angle back to the server with view signaling and to allow the server to adapt the encoding parameters according to the viewing angle. The server can transfer the data so that visible regions (active image sources) use more of the available bandwidth and have better quality, while using a smaller portion of the bandwidth (and lower quality) for the regions not currently visible or expected to visible shortly based on the head motion (passive image sources). In practice this would mean that when a user quickly turns their head significantly, the content would at first have worse quality but then become better as soon as the server has received the new viewing angle and adapted the stream accordingly. An advantage may be that while head movement is less, the image quality would be improved compared to the case of a static bandwidth allocation equally across the scene. This is illustrated in FIG. 7*b*, where active source signals V1, V2, V5 and V7 are coded with better quality than the rest of the source signals (passive image sources) V3, V4, V6 and V8.

In broadcasting cases (with multiple viewers) the server may broadcast multiple streams where each have different area of the spherical panorama heavily compressed instead of one stream where everything is equally compressed. The viewing device may then choose according to the viewing angle which stream to decode and view. This way the server does not need to know about individual viewer's viewing angle and the content can be broadcast to any number of receivers.

To save bandwidth, the image data may be processed so that part of the spherical view is transferred in lower quality. This may be done at the server e.g. as a pre-processing step so that the computational requirements at transmission time are smaller In case of one-to-one connection between the viewer and the server (i.e. not broadcast) the part of the view that's transferred in lower quality is chosen so that it's not visible in the current viewing angle. The client may continuously report its viewing angle back to the server. At the same time the client can also send back other hints about the quality and bandwidth of the stream it wishes to receive.

In case of broadcasting (one-to-many connection) the server may broadcast multiple streams where different parts of the view are transferred in lower quality and the client then selects the stream it decodes and views so that the lower quality area is outside the view with its current viewing angle.

Some ways to lower the quality of a certain area of the spherical view include for example:

Lowering the spatial resolution and/or scaling down the image data;
Lowering color coding resolution or bit depth;
Lowering the frame rate;
Increasing the compression; and/or
Dropping the additional sources for the pixel data and keeping only one source for the pixels, effectively making that region monoscopic instead of stereoscopic.

All these can be done individually, in combinations, or even all at the same time, for example per source basis by breaking the stream into two or more separate streams that are either high quality streams or low quality streams and contain one or more sources per stream.

These methods can also be applied even if all the sources are transferred in the same stream. For example a stream that contains 8 sources in an octahedral arrangement can reduce the bandwidth significantly by keeping the 4 sources intact that cover the current viewing direction completely (and more) and from the remaining 4 sources, drop 2 completely, and scale down the remaining two. In addition, the server can update those two low quality sources only every other frame so that the compression algorithm can compress the unchanged sequential frames very tightly and also possibly set the compression's region of interest to cover only the 4 intact sources. By doing this the server manages to keep all the visible sources in high quality but significantly reduce the required bandwidth by making the invisible areas monoscopic, lower resolution, lower frame rate and more compressed. This will be visible to the user if he/she rapidly changes the viewing direction, but then the client will adapt to the new viewing angle and select the stream(s) that have the new viewing angle in high quality, or in one-to-one streaming case the server will adapt the stream to provide high quality data for the new viewing angle and lower quality for the sources that are hidden.

Synthetic 3D content can be rendered from the internal model of the scene using a graphics processing unit for interactive playback. Such an approach is common e.g. in computer games. However, the complexity and realism of such content is always limited by the amount of local processing power available, which is much less than would be available for non-live rendering.

However, pre-rendering 3D films with computer-animated 3D content are conventionally delivered with a fixed viewpoint encoded into pairs of stereo images. At best, the viewer can manually select a pair of his liking, although in a cinema environment, only one pair is available. These approaches do not have the interactive potential of the locally rendered content.

Figure 8:
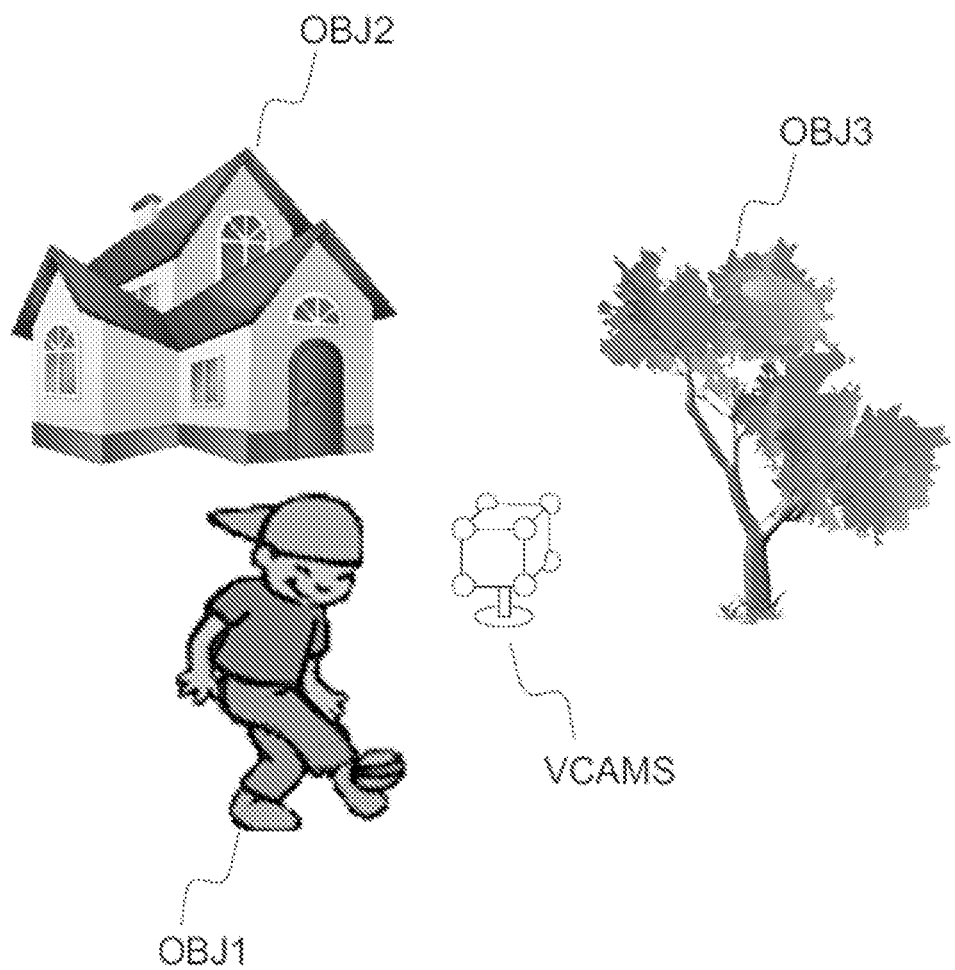
FIG. 8 illustrates the use of synthetic image sources in a virtual reality model for creating images for stereo viewing.

FIG. 8 illustrates the use of synthetic video sources in a virtual reality model for creating images for stereo viewing. A technique used in this application is to use the same method already described previously for capturing real-world content to pre-render, distribute and playback virtual content rendered by computers. In this case, as shown in FIG. 8, a virtual camera device VCAMS comprising a plurality of cameras is positioned in the virtual world of the movie, and the action taking place is captured by the computer into video streams corresponding to the virtual cameras of the virtual camera device. In other words, the content delivered to a player would be generated synthetically in the same way as for a conventional 3D film, however including multiple camera views (more than 2) covering an entire sphere around the virtual viewer at least twice, and multiple audio streams allowing a realistic audio signal to be created for each viewer orientation. In practical terms, the internal three-dimensional (moving) model of the virtual world is used to compute the image source images. Rendering the different objects OBJ1, OBJ2 and OBJ3 result in an image captured by a camera, and the computations are carried out for each camera. For example, 360 degree virtual cameras at the corners of a tetrahedron would provide similar overlap amount as the physical 8-camera device described earlier. 4 cameras that capture the full scene but have the disparity properties when taken in pairs would allow free-angle stereo viewing of the synthetic world. 8 half-sphere cameras may also be used, or any other practical number. The virtual cameras do not obstruct each other in the same manner as real cameras, because virtual cameras can be made invisible in the virtual world. Therefore, the number of virtual cameras can be matched to be such that the viewer device can carry out rendering of the images.

At the viewing device, the wide-angle synthetic source signals may be decoded, and the stereo images of the synthetic world may be created by choosing the left and right eye source signals and possibly creating the images by the stitching method described earlier, if there is need for such stitching. The result is that each viewer of this content can be inside the virtual world of the film, able to look in all directions, even while the film is paused.

Figure 9A:
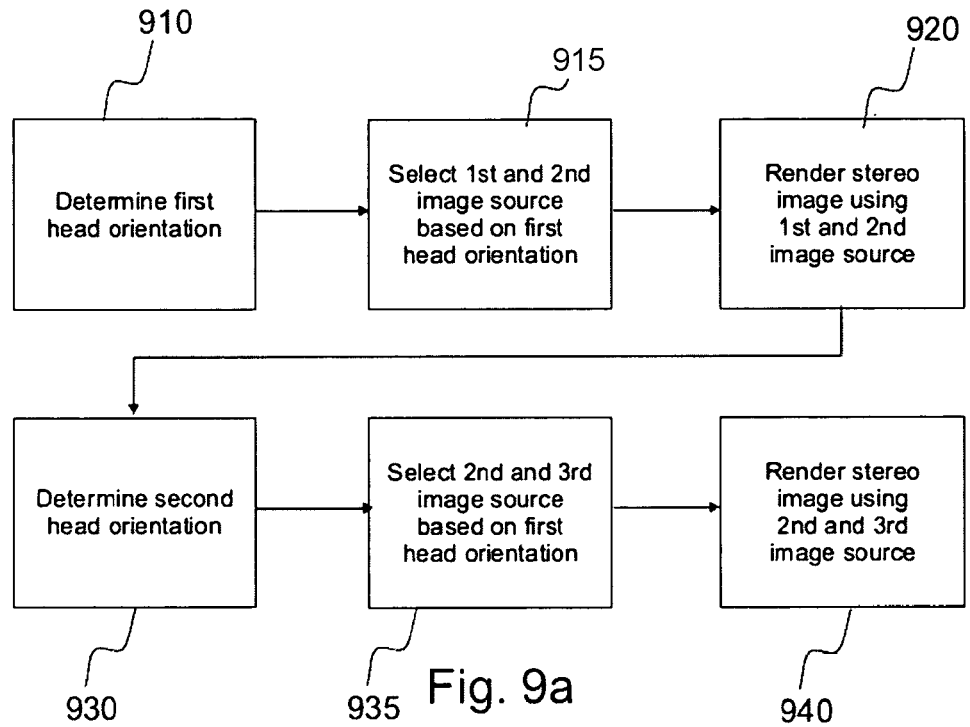
FIG. 9a shows a flow chart of a method for forming images for stereo viewing.

FIG. 9a shows a flow chart of a method for forming images for stereo viewing. As described earlier, head orientation of a user is first determined in phase 910 to obtain a first head orientation. Based on this head orientation, a first image source and a second image source based are selected in 915. These image sources are such that they form a stereo image source, that is, a stereo image created from images of these two sources would produce an understanding of a three-dimensional picture in the human visual system. A first stereo image is created in 920 by rendering a first target image for one eye of the user using the first image source and a second target image for another eye of the user using the second image source. The image sources may suffice for the whole first and second target images, or other image sources may also be used, as has been described earlier. Head orientation of the user is determined again to obtain a second head orientation in 930. The same second image source and a new third image source are now selected based on the second head orientation in 935. These image sources are such that they form a stereo image source, that is, a stereo image created from images of these two sources would produce an understanding of a three-dimensional picture in the human visual system. Then, in 940, a second stereo image is created by rendering a third target image for one eye of the user using the second image source and a fourth target image for another eye of the user using the third image source.

Figure 9B:
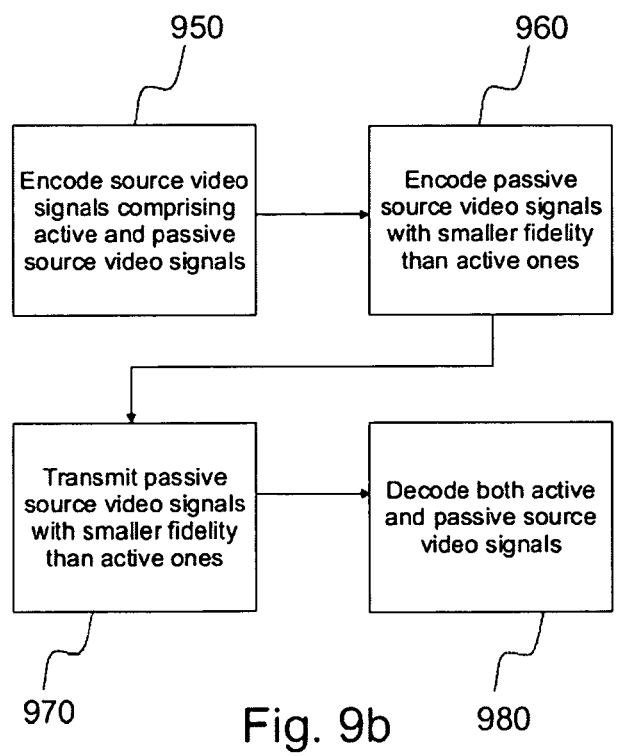
FIG. 9b shows a flow chart of a method for transmitting images for stereo viewing.

FIG. 9b shows a flow chart of a method for transmitting images for stereo viewing.

The various embodiments of the invention can be implemented with the help of computer program code that resides in a memory and causes the relevant apparatuses to carry out the invention. For example, a device may comprise circuitry and electronics for handling, receiving and transmitting data, computer program code in a memory, and a processor that, when running the computer program code, causes the device to carry out the features of an embodiment. Yet further, a network device like a server may comprise circuitry and electronics for handling, receiving and transmitting data, computer program code in a memory, and a processor that, when running the computer program code, causes the network device to carry out the features of an embodiment.

It is obvious that the present invention is not limited solely to the above-presented embodiments, but it can be modified within the scope of the appended claims.

The invention claimed is:

1. A device for creating stereo viewing image data, comprising:
   at least one processor; and
   at least one memory including computer program code;
   wherein said at least one memory including computer program code is configured, with the at least one processor, to cause the device to:
      choose a pair of cameras from among a set of three cameras of said at least three cameras based upon a first signal, the at least three cameras being regularly spaced so as to have equal distances therebetween or irregularly spaced so as to have unequal distances therebetween and located in such a manner with respect to each other such that any pair of cameras of the set of three cameras of said at least three cameras has a disparity for creating a first stereo image having a disparity, the set of three cameras having overlapping fields of view such that an overlap region to be captured by said at least three cameras is defined, wherein said at least three cameras have a wide field of view, the first signal being indicative of at least a head orientation of a user, a position of a left eye of the user, and a position of a right eye of the user, wherein a first camera of said pair of cameras is chosen as being the closest camera of the set of three cameras to a first viewpoint from the left eye of the user and a second camera of said pair of cameras is chosen as being the closest camera of the set of three cameras to a second viewpoint from the right eye of the user, so that the disparity created by the pair of cameras resembles the disparity between the left and right eyes of the user, said disparity created by the pair of cameras being caused by a difference between the first viewpoint and the second viewpoint, thereby creating the first stereo image;
      create a first image for the left eye and a second image for the right eye for stereo viewing by stitching together sections of images from said at least three cameras so that seams between stitched images are positioned away from a centerline of one or more of the first viewpoint and the second viewpoint, wherein a stitching point of the first image and a stitching point of the second image are changed dynamically based on the head orientation to increase an area around a particular region of the view that is taken from a nearest one of the first camera and second camera to the position of the left eye and the position of the right eye, respectively;
      receive a second signal indicating that a change in the head orientation of the user has occurred between a first head orientation to a second head orientation;
      temporally transition from one view orientation to another view orientation by blending at least a part of at least two images from a second pair of said at least three cameras, wherein said second pair of said at least three cameras comprises at least one camera that is different from cameras comprising said pair of said at least three cameras, thereby creating a second stereo image different from the first stereo image; and
      encode the first stereo image and the second stereo image such that active portions of the first and second stereo images have a fidelity that is greater than the fidelity of corresponding passive portions of, respectively, the first and second stereo images.

2. The device according to claim 1, wherein said pair of cameras of said set of three cameras of said at least three cameras has a parallax corresponding to parallax of human eyes for creating stereo images.

3. The device of claim 2, wherein said parallax between said pair of cameras is between 5.0 cm and 12.0 cm.

4. The device according to claim 1, wherein said at least three cameras have different directions of optical axis.

5. The device according to claim 1, wherein said overlap region forms a contiguous surface with no holes or essentially no holes so that the disparity can be obtained across at least for a majority of the overlap region.

6. The device according to claim 1, wherein the field of view of each of said at least three cameras approximately corresponds to a half sphere.

7. The device according to claim 1, wherein the at least three cameras comprise three cameras, said three cameras being arranged in a triangular setting, whereby the directions of optical axes between any pair of cameras form an angle of less than 90 degrees.

8. The device according to claim 1, wherein the at least three cameras comprise:
eight wide-field cameras positioned essentially at respective corners of a virtual cube and each respective wide-field camera having a direction of optical axis essentially from the center point of the virtual cube to the corner at which the respective wide-field camera is positioned,
wherein the field of view of each of said wide-field cameras is at least 180 degrees, so that each part of the whole sphere view is covered by at least four cameras.

9. The device of claim 1, wherein the device is further adapted to perform the blending by weighted summing of the affected image region values.

10. A method, comprising:
choosing a pair of cameras from among a set of three cameras of at least three cameras based upon a first signal, the at least three cameras being regularly spaced so as to have equal distances therebetween or irregularly spaced so as to have unequal distances therebetween and located in such a manner with respect to each other such that any pair of cameras of a set of three cameras of said at least three cameras has a disparity for creating a stereo image having the disparity, the set of three cameras having overlapping fields of view such that an overlap region to be captured by said at least three cameras is defined, wherein said at least three cameras have a wide field of view, the first signal being indicative of at least a head orientation of a user, a position of a left eye of the user, and a position of a right eye of the user, wherein a first camera of said pair of cameras is chosen as being the closest camera of the set of three cameras to a first viewpoint from the left eye of the user and a second camera of said pair of cameras is chosen as being the closest camera of the set of three cameras to a second viewpoint from the right eye of the user, so that the disparity created by the pair of cameras resembles a disparity that a pair of eyes of the user of the camera device would have when each eye of the pair of eyes of the user is at a same respective location to the location of each camera of the pair of cameras, said disparity of the pair of cameras being created by an angular distance between the first viewpoint and the second viewpoint;
creating a first image for the left eye and a second image for the right eye for stereo viewing by stitching together sections of images from said at least three cameras so that seams between stitched images are positioned away from a centerline of a combined viewport of the user, wherein a stitching point of the first image and a stitching point of the second image are changed dynamically based on the head orientation to increase an area around a particular region of the view that is taken from a nearest one of the first camera and second camera to the position of the left eye and the position of the right eye, respectively;
receiving a second signal indicating that a change in the head orientation of the user has occurred between a first head orientation to a second head orientation;
performing a temporal transition from one view orientation to another view orientation by blending at least a part of at least two images from a second pair of said at least three cameras, wherein said second pair of said at least three cameras comprises at least one camera that is different from cameras comprising said pair of said at least three cameras; and
encoding the first stereo image and the second stereo image such that active portions of the first and second stereo images have a fidelity that is greater than the fidelity of corresponding passive portions of, respectively, the first and second stereo images.

11. The method according to claim 10, wherein said pair of cameras of said set of three cameras of said at least three cameras is configured to define a parallax corresponding to the parallax of the left and right eyes of the user for creating a stereo image, wherein the parallax is a displacement in the apparent position of an object viewed along two different lines of sight of the respective first and second cameras that is created by an angular distance between the first camera and the second camera of the pair of cameras relative to the object viewed along the two different lines of sight.

12. The method according to claim 11, wherein said parallax between said pair of cameras is between 5.0 cm and 12.0 cm.

13. The method according to claim 10, further comprising:
causing a respective optical axis of each camera from said at least three cameras to have a different direction.

14. The method according to claim 10, wherein said overlap region forms a contiguous surface with no holes or essentially no holes so that the disparity can be obtained across at least for a majority of the overlap region.

15. The method according to claim 10, wherein the field of view of each of said at least three cameras approximately corresponds to a half sphere.

16. The method according to claim 10, wherein said at least three cameras are arranged in a triangular setting, each camera of said at least three cameras having a respective optical axis, whereby any pair of cameras from said at least three cameras form an angle of less than 90 degrees.

17. The method according to claim 10, wherein the at least three cameras are configured as:
eight wide-field cameras positioned approximately at respective corners of a virtual cube, each respective wide-field camera of the eight wide-field cameras having an optical axis direction from approximately a respective corner of the virtual cube at which the respective wide-field camera is positioned to a center point of the virtual cube,
wherein the field of view of each of said wide-field cameras is at least 180 degrees, so that each part of the whole sphere view is covered by at least four cameras.

18. The method of claim 10, wherein blending at least said part of said at least two images from said at least three cameras comprises:
weighted summing of the affected image region values.

19. A non-transitory computer readable medium comprising program instructions for causing an apparatus to perform at least the following:

choosing a pair of cameras from among a set of three cameras of at least three cameras based upon a first signal, the at least three cameras being regularly spaced so as to have equal distances therebetween or irregularly spaced so as to have unequal distances therebetween and located in such a manner with respect to each other such that any pair of cameras of the set of three cameras of said at least three cameras has a disparity for creating a stereo image having the disparity, the set of three cameras having overlapping fields of view such that an overlap region to be captured by said at least three cameras is defined, wherein said at least three cameras have a wide field of view, the first signal being indicative of at least a head orientation of a user, a position of a left eye of the user, and a position of a right eye of the user, wherein a first camera of said pair of cameras is chosen as being the closest camera of the set of three cameras to a first viewpoint from the left eye of the user and a second camera of said pair of cameras is chosen as being the closest camera of the set of three cameras to a second viewpoint from the right eye of the user, so that the disparity created by the pair of cameras resembles a disparity that a pair of eyes of the user of the camera device would have when each eye of the pair of eyes of the user is at a same respective location to the location of each camera of the pair of cameras, said disparity of the pair of cameras being created by an angular distance between the first viewpoint and the second viewpoint;

creating a first image for the left eye and a second image for the right eye for stereo viewing by stitching together sections of images from said at least three cameras so that seams between stitched images are positioned away from a centerline of a viewport of the user, wherein a stitching point of the first image and a stitching point of the second image are changed dynamically based on the head orientation to increase an area around a particular region of the view that is taken from a nearest one of the first camera and second camera to the position of the left eye and the position of the right eye, respectively;

receiving a second signal indicating that a change in the head orientation of the user has occurred between a first head orientation to a second head orientation;

performing a temporal transition from one view orientation to another view orientation by blending at least a part of at least two images from a second pair of said at least three cameras, wherein said second pair of said at least three cameras comprises at least one camera that is different from cameras comprising said pair of said at least three cameras; and encoding the first stereo image and the second stereo image such that active portions of the first and second stereo images have a fidelity that is greater than the fidelity of corresponding passive portions of, respectively, the first and second stereo images.

20. The non-transitory computer readable medium according to claim 19, wherein the program instructions further cause the apparatus to cause said pair of cameras of said set of three cameras of said at least three cameras to define a parallax corresponding to the parallax of the first and second eyes of the user for creating a stereo image, wherein the parallax is a displacement in the apparent position of an object viewed along two different lines of sight of the respective first and second cameras that is created by an angular distance between the first camera and the second camera of the pair of cameras relative to the object viewed along the two different lines of sight.

21. The non-transitory computer readable medium according to claim 20, wherein said parallax between said pair of cameras is between 5 cm and 12 cm.

22. The non-transitory computer readable medium according to claim 19, wherein the program instructions further cause the apparatus to cause each camera from said at least three cameras to have a different optical axis direction.

23. The non-transitory computer readable medium of claim 19, further comprising program instructions for causing the apparatus to perform at least the following:

performing the blending by weighted summing of the affected image region values.

* * * * *